(12) United States Patent
Krishnamurthy et al.

(10) Patent No.: US 11,308,940 B2
(45) Date of Patent: Apr. 19, 2022

(54) COUNTERFACTUAL ANNOTATED DIALOGUES FOR CONVERSATIONAL COMPUTING

(71) Applicant: Microsoft Technology Licensing, LLC, Redmond, WA (US)

(72) Inventors: Jayant Sivarama Krishnamurthy, Berkeley, CA (US); Zachary John Tellman, Oakland, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 244 days.

(21) Appl. No.: 16/593,803

(22) Filed: Oct. 4, 2019

(65) Prior Publication Data
US 2021/0043194 A1 Feb. 11, 2021

Related U.S. Application Data

(60) Provisional application No. 62/883,034, filed on Aug. 5, 2019.

(51) Int. Cl.
| | |
|---|---|
| *G10L 15/00* | (2013.01) |
| *G10L 15/16* | (2006.01) |
| *G06F 16/901* | (2019.01) |
| *G10L 15/22* | (2006.01) |

(52) U.S. Cl.
CPC .......... *G10L 15/16* (2013.01); *G06F 16/9027* (2019.01); *G10L 15/005* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 10,055,403 B2 * | 8/2018 | Bui | G06F 40/35 |
| 10,303,773 B2 * | 5/2019 | Curtis | G06F 40/35 |
| 2019/0182382 A1 * | 6/2019 | Mazza | G10L 15/26 |
| 2019/0198016 A1 * | 6/2019 | Mckenzie | G10L 15/19 |

* cited by examiner

*Primary Examiner* — Satwant K Singh
(74) *Attorney, Agent, or Firm* — Alleman Hall Creasman & Tuttle LLP

(57) ABSTRACT

A method of configuring a conversational computing interface. The method comprises maintaining a branching dialogue representing a plurality of multi-turn conversations each including a plurality of turns, wherein a turn indicates one or both of a conversational computing interface action and a conversation event, the branching dialogue including a shared prefix of turns common to the plurality of multi-turn conversations and at least two different counterfactual branches descending from the shared prefix of turns, each different counterfactual branch including one or more descendent turns corresponding to a different multi-turn conversation of the plurality of multi-turn conversations. The method further comprises providing the branching dialogue in a computer-readable format traversable to retrieve a particular multi-turn conversation of the plurality of multi-turn conversations, the particular multi-turn conversation represented by the shared prefix of turns and a particular counterfactual branch including descendent turns corresponding to the particular multi-turn conversation.

20 Claims, 8 Drawing Sheets

COUNTERFACTUAL ANNOTATED DIALOGUES FOR CONVERSATIONAL COMPUTING

CROSS REFERENCE TO RELATED APPLICATIONS

This application claims priority to U.S. Provisional Patent Application Ser. No. 62/883,034, filed Aug. 5, 2019, the entirety of which is hereby incorporated herein by reference for all purposes.

BACKGROUND

Conversational computing interfaces that utilize machine learning or other artificial intelligence techniques may be trained with exemplary dialogues. Two different dialogues may start with the same interaction between a user and a conversational computing interface, but the dialogues may diverge based on different reactions from the user and/or different real-world context. Although training such conversational interfaces may benefit from a large number of different dialogues, accessing and maintaining many different dialogues may present a burden on computer storage, data maintenance costs, and/or computer processor utilization. Furthermore, the different dialogues may include a large number of similar dialogues that may skew a distribution of the dialogues toward duplicative and/or infrequently used dialogues, which may undesirably affect training of the conversational computing interface.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of configuring a conversational computing interface, comprises maintaining a branching dialogue representing a plurality of multi-turn conversations each including a plurality of turns, wherein a turn indicates one or both of a conversational computing interface action and a conversation event. The branching dialogue includes a shared prefix of turns common to the plurality of multi-turn conversations and at least two different counterfactual branches descending from the shared prefix of turns. Each different counterfactual branch includes one or more descendent turns corresponding to a different multi-turn conversation of the plurality of multi-turn conversations. The method further comprises providing the branching dialogue in a computer-readable format traversable to retrieve a particular multi-turn conversation of the plurality of multi-turn conversations, the particular multi-turn conversation represented by the shared prefix of turns and a particular counterfactual branch including descendent turns corresponding to the particular multi-turn conversation.

DETAILED DESCRIPTION

Figure 1A:
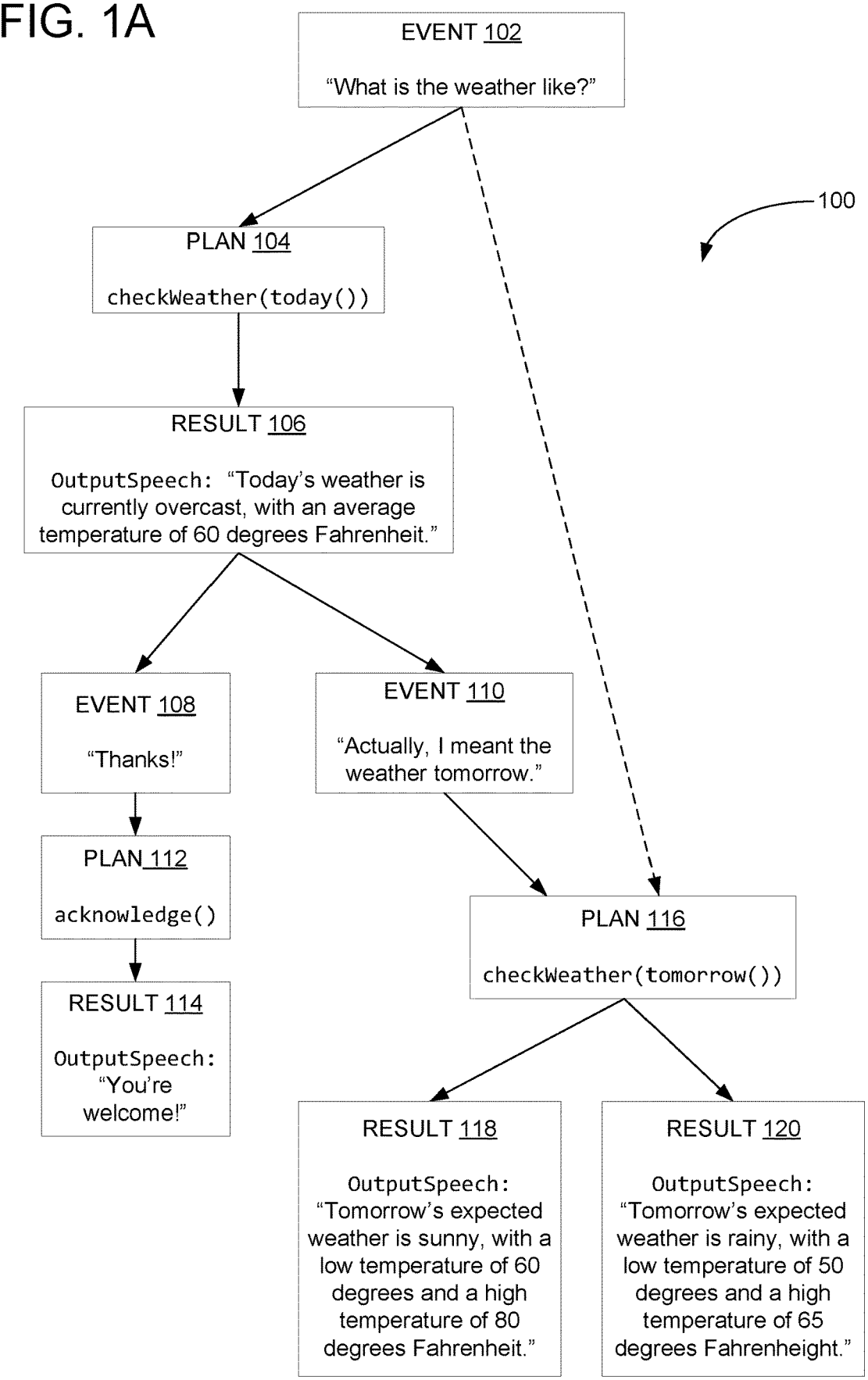
FIG. 1A shows an exemplary branching dialogue.

Conversational computing interfaces enable human users to interact with computers in a more natural manner. A properly trained conversational computing interface is able to process natural user interactions such as spoken user utterances or written user commands, without requiring the user to use a particular syntax defined by the computer. This allows the human user to use natural language when addressing the computer. For example, the user may interact using natural language by asking the computer to answer a question or by giving the computer a command. In response, the conversational computing interface is trained to automatically perform actions, such as answering questions or otherwise assisting the user (e.g., reporting today's weather forecast in response to the user saying or typing "What is the weather like").

Conversational computing interfaces may be configured to respond to any suitable user interaction event(s) that may be detected by a computer with any suitable input devices/sensors. Non-limiting examples of events include user utterances in the form of speech and/or text, button presses, network communication events (e.g., receiving a result of an application programming interface (API) call), gesture inputs, etc. More generally, events include any occurrences that may be relevant to user interaction and that are detectable by a conversational computing interface, for example via input/output hardware (e.g., microphones, cameras, keyboards, touchscreens), communication hardware, and the like.

Conversational computing interfaces may be configured to perform any suitable actions to assist a user. Non-limiting examples of actions include performing computations, controlling other computers and/or hardware devices, (e.g., by invoking an API), communicating over networks (e.g., to invoke an API), receiving user input (e.g., in the form of any detectable event), and/or providing output (e.g., in the form of text or speech). More generally, actions may include any behaviors that a computer system is configured to perform. Other non-limiting examples of actions include controlling electronic devices (e.g., turning on/off lights in a user's home, adjusting a thermostat, playing multimedia content via display/speakers), interacting with commercial and/or other services (e.g., invoking an API to schedule a ride via a ride-hailing service, ordering food/packages via a delivery service), and/or interacting with other computer systems (e.g., to access information from a website or database, send an email, access a user's schedule in a calendar program).

Accordingly, by recognizing various events and in response, performing relevant actions, conversational computing interfaces enable users to use conversation, gesture, and other modes of expression to control a computer to perform any suitable tasks.

Conversational computing interfaces can use natural language processing (NLP) techniques (e.g., machine learning classifiers) to process an input user utterance (e.g., user speech and/or submitted text) in order to perform an action related to the input user utterance. For example, an automated assistant may support a predefined plurality of hard-coded templates, where each template has a number of slots that can be filled to parametrize a hard-coded action. As an example, an automated assistant may support a pre-defined interaction to invoke an API, e.g., to reserve a seat at a restaurant, call a ride-hailing service, and/or look up the weather. However, although automated assistants may support a plurality of different predefined actions via the pre-defined templates, an automated assistant that only supports predefined actions via templates may not be configured to perform more complex or novel behaviors.

More generally, conversational computing interfaces may be configured to recognize various events, and to perform various actions in response to events by generating a computer-executable plan. "Plan" is used herein to refer to any suitable representation of steps that may be taken by a computer in order to perform an action (e.g., computer-executable code, such as computer-executable bytecode in a data-flow programming language).

In some examples, conversational computing interfaces may be trained on annotated dialogues. "Annotated dialogue" is used herein to refer to any suitable representation of an exemplary conversation between a human and a conversational computing interface (e.g., a dialogue), including any suitable annotations indicating actions that were taken by the conversational computing interface in response to events in the conversation. Generally speaking, annotations may include anything that is associated with an event (e.g., an utterance or other input from a human user participating in a dialogue), including but not limited to plans, results, traces, and/or any suitable metadata (e.g., metadata indicating descriptions of a context in which the dialogue takes place, or metadata indicating user satisfaction with a plan).

In some examples, an annotated dialogue may include one or more "turns," each turn representing a portion of the dialogue corresponding to contributions to the dialogue by a human or by a conversational computing interface. Accordingly, a turn may include any suitable representation of an event (e.g., an utterance by a human) and/or an action by a conversational computing interface. In some examples, an annotated dialogue may include a sequence of turns that alternates between human turns (e.g., events such as utterances by the human) and conversational computing interface turns (e.g., actions by the conversational computing interface in response to the utterances by the human).

An annotated dialogue may indicate desired behavior for a conversational computing interface, for example by including possible events that could occur in a conversation, along with an indication of actions that should be taken in order to respond to the events. As a result of training on annotated dialogues, a conversational computing interface may be configured to respond to an event that occurs in a conversation with an appropriate action. For example, the conversational computing interface may be trained to reproduce an action that was taken in response to the event in an annotated dialogue. As another example, the conversational computing interface may be trained to generate an action specifically for responding to the event, where the action was not necessarily indicated in any annotated dialogue. For example, the conversational computing interface may be trained to generate an action that is similar to an action that was taken for some other event in an annotated dialogue. Annotated dialogues may be collected in any suitable manner, e.g., from historical data, generated by simulation, and/or obtained from human demonstrators.

However, it may be computationally and/or conceptually difficult to maintain a suitably large and/or diverse plurality of annotated dialogues on a computer storage system, while also ensuring that a suitable distribution of dialogues can be efficiently accessed for training. For example, separately storing a large number of different dialogues may require a large amount of storage space. Although many different dialogues may include identical and/or similar information (e.g., a common prefix of turns that occur in more than one dialogue), when these different dialogues are stored separately, the common prefix may be redundantly stored a large number of times.

Furthermore, the different dialogues may represent a different proportion of dialogues than a desired distribution for training. For example, the large variety of different possible dialogues may correspond to a diverse variety of possible "edge cases" that, while encompassing many different possible dialogues, nevertheless may only occur a small proportion of the time in actual operation of the conversational computing interface. Repeatedly training on dialogues that only occur a small proportion of the time may result in little or no benefit to the overall performance of the conversational computing interface. However, achieving a desired distribution of dialogues for training may be substantially complicated when many different dialogues are stored separately. For example, it may be desirable to sample an annotated dialogue from a distribution that approximates actual dialogues that occur in live operation of the conversational computing interface. However, if a large proportion of different dialogues are "edge cases" that correspond to only a small proportion of actual dialogues, achieving the desired distribution may be computationally expensive (e.g., due to searching/filtering the computer storage system to find relevant dialogues).

Furthermore, when a large number of dialogues are stored, it may be computationally expensive to assess relationships between different annotated dialogues, for example to search or filter similar dialogues that include one or more same and/or similar turns (e.g., dialogues that include a common prefix of turns, such as all dialogues starting with a particular user utterance). For example, when a large number of different dialogues are all stored as atomic files, searching for a particular dialogue or searching for multiple related dialogues may require inspecting the entire set of different dialogues.

In some examples, conversational computing interfaces may be trained to recover from error conditions. However, current state-of-the-art machine learning algorithms for training to recover from errors (e.g., the DAgger™ algorithm) may require annotated dialogues representing two or more different counterfactual scenarios. "Counterfactual scenarios" may be used herein to refer to any two or more different scenarios in dialogues that are related, but that include different turns at some point (e.g., different events and/or actions). For example, counterfactual scenarios include dialogues that start the same way (e.g., dialogues that have a common prefix of turns), but which diverge as different turns occur in each dialogue. For example, the difference between counterfactual scenarios may be due to a different event occurring in each of the counterfactual scenarios, and/or a different plan being generated for an event that occurs in the counterfactual scenarios. As an example, a dialogue may indicate two or more different counterfactual scenarios by including, for a given turn including an event, two or more different plans for responding to the event. For example, the counterfactual scenarios may indicate that a certain plan was generated and executed in response to an event, while also indicating an alternative plan that was generated but not executed.

In some examples, conversational computing interfaces may be trained to generate more than one different plan in response to an event, for example, generating alternative acceptable ways to respond to the event. Accordingly, such training may require annotated dialogues representing two or more different counterfactual plans (e.g., two or more different alternative plans that may be applicable in response to the same event). As an example, the conversational computing interface may be configured to generate a plurality of different candidate plans for responding to an event, and to execute only one of the candidate plans. Nevertheless, the different candidate plans may be stored in the dialogue store, for example, for use in training, and/or to enable rapid retrieval of candidate plans. In some examples, the plan that was generated and executed may result in an error, and accordingly the alternative plan may represent a possible approach that may not result in that error. For example, if a plan that is generated and executed results in an error, and if there are different candidate plans stored in the dialogue store, then recovering from the error may include executing one of the different candidate plans.

In some examples, annotated dialogues may be stored in a normalized format, for example as an efficient bytecode sequence. In some examples, utilizing annotated dialogues (e.g., for training) may require denormalization from such a normalized format into an expanded format, which may increase computational expense of utilizing the annotated dialogues, as well as increasing computational expense and/or conceptual difficulty of searching and/or filtering a computer storage system to find particular dialogues.

In some examples, there may be additional data and/or metadata associated with specific parts of a dialogue. For example, a dialogue may be associated with metadata related to maintaining annotated dialogues and/or training on annotated dialogues, such as versioning data indicating whether an annotated dialogue should be used for training. However, in some examples, the normalized file format may be configured to represent only particular data for annotated dialogues (e.g., turn data including events), and the normalized file format may not be configured to represent additional data/metadata. As such, it may be necessary to store the additional data/metadata in separate files and/or data structures. However, maintaining an association between the additional data/metadata and all related dialogues may be computationally and/or conceptually difficult, for example, due to maintaining additional indexing structures to indicate how the additional data/metadata relates to particular annotated dialogues and/or parts of annotated dialogues.

Furthermore, when dialogues are saved separately/atomically, extending/editing a dialogue may require re-allocation of storage space for the dialogue. Accordingly, building up a dialogue incrementally may require storage overheads, repeated re-allocation of computer storage as the size of the dialogue changes, and/or other computationally and/or conceptually difficult adjustments.

An exemplary branching dialogue 100 is shown in FIG. 1A. The branching dialogue 100 represents one or more different annotated dialogues in an integrated graph. Branching dialogue 100 is a conceptual representation of relevant aspects of a branching dialogue, including a plurality of branching paths each representing one of the different annotated dialogues. Branching dialogue 100 may be accessed and/or maintained on a computer by representing branching dialogue 100 in a dialogue store data structure. For example, an exemplary dialogue store data structure 1000 is described below with regard to FIG. 1B. More generally, branching dialogue 100 may be stored in any suitable data structure for representing graphs, for example in a content-addressed graphical data structure. For example, nodes of the graph may represent turns in an annotated dialogue, including events, plans, and/or results.

"Data structure" is used herein to refer to any defined computer functions, data, and/or metadata configured for organizing contents of a computer memory, for example including datatypes, database schema, records, tuples, arrays, pointers, references, and/or enumerations. Data structure implementations may include functions for creating/accessing/maintaining the data structure, data types and/or schemas for organizing contents of the data structure, instances of the data structure (e.g., a specific branching dialogue represented in a dialogue store data structure), and/or any other suitable computer functions and/or data associated with a data structure.

Data structures may be implemented using any suitable state-of-the-art and/or future data structure programming techniques. Although the present disclosure describes a dialogue store data structure with regard to the exemplary dialogue store data structure 1000, the examples described herein are not limiting. Contents of dialogue store data structures according to the present disclosure may be arranged in computer memory in any suitable fashion using any suitable data structure programming techniques (e.g., using a different, alternative dialogue store data structure). Similarly, although exemplary operations on the dialogue store data structure 1000 are presented herein, the same or different operations may be implemented for other dialogue store data structures, using other suitable data structure programming techniques. Dialogue store data structures may be referred to as dialogue stores and/or stores.

The organization of the branching dialogue 100, when represented in a suitable dialogue store data structure, reflects the relationship(s) between different annotated dialogues. As an example, the dialogue store data structure permits efficient searching/filtering of a branching dialogue to find dialogues (e.g., defined by paths in the branching dialogue) that are related, such as dialogues that have a common prefix of turns. As another example, the dialogue store data structure permits representing branching dialogues including counterfactual turns, e.g., to use as training data for error recovery. Dialogue store data structures and branching dialogues are described herein with regard to an exemplary conversational computing interface. For example, the dialogue store data structures described herein may be used to define branching dialogues with turns that include events, plans, and/or results (e.g., traces defined by events, plans, and/or results). An annotated dialogue may include one or more turns, wherein each turn includes one or more of: 1) an event such as a user utterance 2) possible plans that could be executed by a conversational computing interface to respond to the events, and/or 3) results of responding to the events. Accordingly, the branching dialogue 100 may be represented in a suitable data structure including one or more nodes corresponding to turns (e.g., a content-addressed graph structure, such as the dialogue store data structure 1000 described further below with regard to FIG. 1B). For example, for a branching dialogue including a plurality of different multi-turn conversations corresponding to different counterfactual branches that each descend from a shared prefix of turns, the branching dialogue may be maintained in a dialogue store data structure including a plurality of nodes, wherein each node represents a turn in a multi-turn conversation. "Descend" and "descendent" may be used herein to describe a structural relationship represented in a branching dialogue, for example, a turn may be said to descend from any turn that precedes it in a multi-turn conversation. For each node representing a descendent turn, the node may include a pointer indicating a parent node from which that node descends in the dialogue store data structure. In some examples, each node includes at most one pointer indicating a parent node, such that the plurality of nodes and pointers between nodes define a tree structure. In other examples, one or more of the nodes include a plurality of pointers indicating a corresponding plurality of different parent nodes, such that the plurality of nodes and pointers between nodes defines a directed acyclic graph structure. More generally, relationships between nodes and pointers may define any suitable graph structure, representing branching relationships between different multi-turn conversations of the plurality of multi-turn conversations in the branching dialogue. For example, two different nodes of the dialogue store data structure may each have a pointer to a shared parent node, wherein the shared parent node corresponds to a last turn in a shared prefix of turns in multi-turn conversations that include the two different nodes. Accordingly, the two different nodes may be constituent elements of two different counterfactual branches.

Accordingly, branching dialogue 100 includes one or more different annotated dialogues based on the paths among turns in the branching dialogue 100. For example, the branching dialogue 100 includes event nodes 102, 108, and 110. The branching dialogue 100 further includes plan nodes 104, 112, and 116. The branching dialogue 100 further includes result nodes 106, 114, 118, and 120. Each path along arrows in branching dialogue 100 corresponds to an annotated dialogue including the turns defined by nodes in the path. For example, the path through event node 102, plan node 104, result node 106, event node 108, plan node 112, and result node 114 corresponds to an annotated dialogue for a conversation wherein a human user provided input utterances indicated in event node 102 and event node 108. The events are annotated with annotations indicating suitable plans/results for responding to the events. For example, annotations are defined by plan node 104 and result node 106 (e.g., plans/results that may be a suitable response to event node 102), and by plan node 112 and result node 114 (e.g., plans/results that may be a suitable response to event node 108). Similarly, branching dialogue 100 includes other paths corresponding to other annotated dialogues, for example the path through event node 102, plan node 116, and result node 120 (e.g., corresponding to event node 102 annotated with plan node 116 and result node 120).

In some examples, events, plans, and/or results may be stored in the form of a "trace," indicating the events that occurred, plans that were generated and optionally executed, and results that were obtained from executing the plans. In some examples, a turn may include a complete trace including a user event, any plan(s) generated for the user event, and results from executing the plan(s). Alternately or additionally, a turn may include a trace fragment indicating any suitable portion of a trace. In some examples, a turn may be defined by one or more events, plans, and/or results which may not be organized in a trace.

The depicted events, plans, and results in FIG. 1A are non-limiting, abbreviated examples of data for representing events, plans, and/or results. As an example, plans are depicted as simple function calls in a data-flow programming language, but alternately or additionally plans may include other suitable details (e.g., longer programs including more substantial logic and/or control flow constructs). Similarly, events are depicted as strings representing user utterances, but alternately or additionally events may include any other specification of events such as computer input, for example via string data, numeric data (e.g., a code indicating a pressed button, touch screen coordinate input data). Similarly, traced results are depicted as a simple description of output by a conversational computing interface, but traced results may include any additional details, for example, timing information and/or intermediate values (e.g., results of an API call).

In examples, branching dialogues may be represented in a dialogue store data structure implemented as a tree or as a directed acyclic graph (DAG). The dialogue store data structure may represent a hierarchy of turns arranged according to a temporal ordering, wherein a child turn in the hierarchy represents occurrences that happened after a preceding, parent turn in the hierarchy. For example, branching dialogue 100 has arrows showing a temporal ordering, where for example, plan 104 occurs after event 102. For example, plan 104 may be a plan generated in response to event 102. The (solid and dashed) arrows depict ordering between turns. The structure including only the solid arrows is a tree, whereas the structure additionally including the dashed arrow is a DAG.

Alternately or additionally, the dialogue store data structure may represent any suitable relationships between turns (e.g., hierarchical relationships, temporal ordering relationships) in any suitable fashion, for example via a hypergraph and/or cyclic graph. For two nodes with such a temporal/hierarchical relationship, a preceding node (e.g., representing an earlier portion of dialogue) may be referred to as a parent node, while successor nodes (e.g., representing later portions of the same dialogue) may be referred to as child nodes. A particular parent turn node may have more than one child node(s), wherein the different child nodes indicate different possible turns (e.g., counterfactual possibilities) that could occur after the parent turn.

Accordingly, a path through a branching dialogue may indicate a particular annotated dialogue, including the turns indicated by nodes in the path. In some examples, an annotated dialogue starts with a root turn node that represents a first turn in a dialogue. For example, the root turn node may represent a first utterance by a user, in which the user issues a query or command to a conversational computing interface (e.g., to request information, and/or to instruct the conversational computing interface to perform a task). As an example, the branching dialogue 100 includes paths including a root turn node, namely event 102 and subsequent nodes. For example, one such path is the path through event 102, plan 104, result 106, event 108, plan 112, and result 114. The branching dialogue 100 depicts other paths including the same event 102, for example: 1) a path through event 102, plan 104, result 106, event 110, plan 116, and result 118; 2) a path through event 102, plan 104, result 106, event 110, plan 116, and result 120; 3) a path through event 102, plan 116, and result 118; and 4) a path through event 102, plan 116, and result 120. As depicted, the branching dialogue 100 may include several different paths that go through the same node(s).

Figure 1B:
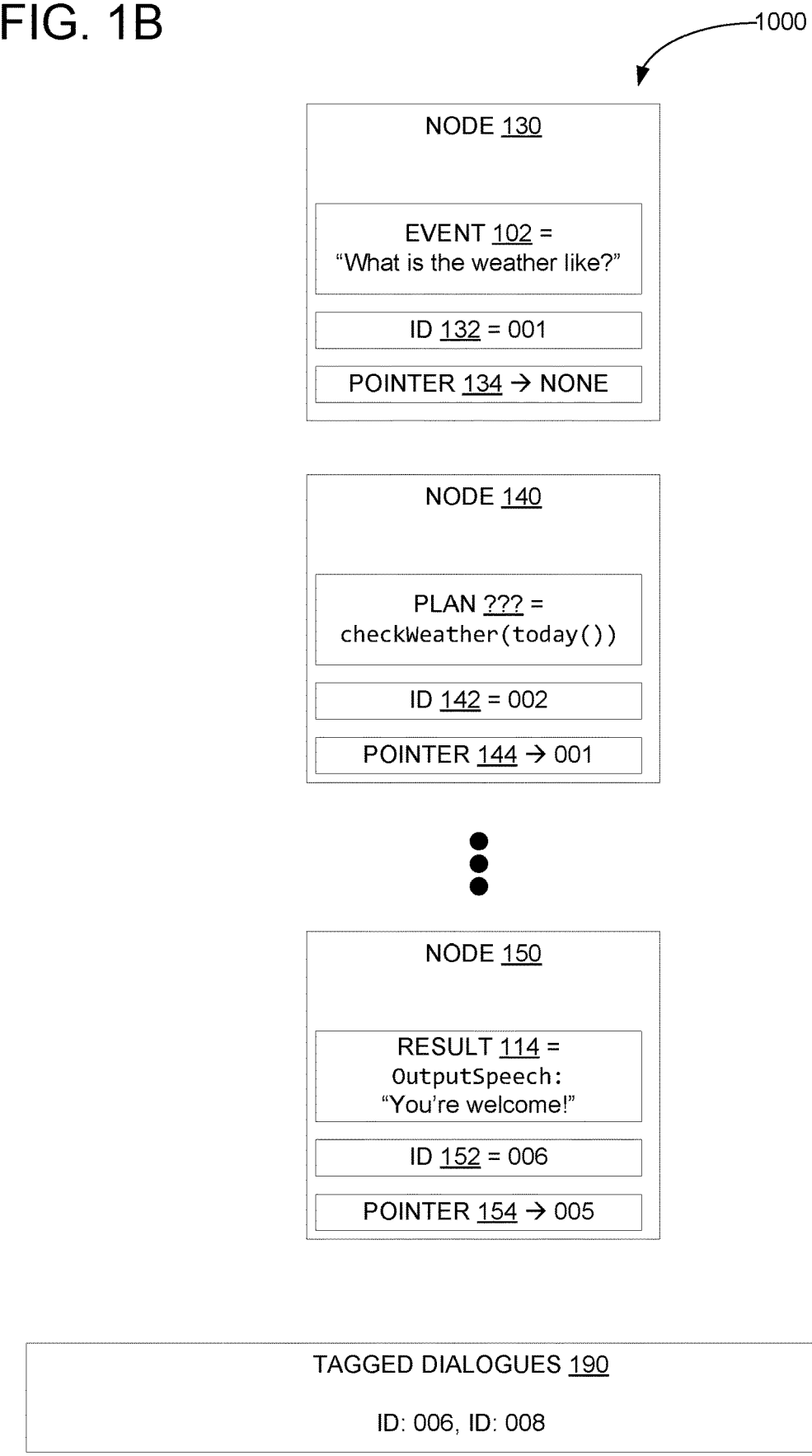
FIG. 1B shows an exemplary dialogue store data structure for branching dialogues.

In some examples, the structure may be represented via pointers from child nodes to parent nodes. For example, FIG. 1B shows aspects of an exemplary dialogue store data structure 1000, suitable for representing branching dialogue 100 as shown in FIG. 1A. Dialogue store data structure 1000 includes records defining a node 130, a node 140, and a node 150 corresponding to turns from branching dialogue 100 shown in FIG. 1A. For example, node 130 corresponds to event 102, node 140 corresponds to plan 104, and node 150 corresponds to result 114. Other turns from branching dialogue 100 are not depicted but may be defined in similar fashion.

Node 130 includes a payload for event 102 including a user utterance associated with event 102. Node 130 further includes an identifier 132 that uniquely identifies node 130. Identifier 132 is depicted as a value "001," e.g., an integer value. This is not required as identifiers may include unique identifying strings (e.g., globally unique identifiers), memory addresses (e.g., pointers), and the like. Node 130 further includes a pointer 134. Pointer 134 is configured to optionally indicate one or more parents of node 130, but node 130 has a pointer value of "none" indicating that node 130 is a root node with no parents. Node 140 includes a payload for a plan 104, e.g., a code fragment in a data-flow programming language that is executable to carry out a plan for responding to event 102. Node 140 further includes an ID 142 and a pointer 144. Pointer 144 of node 140 indicates a value "001," namely indicating the value "001" of ID 132 of node 130. Accordingly, node 140 is a descendent of node 130. Node 150 is similar, including a payload for a result 114 (e.g., an output string), an ID 152, and a pointer 152 (e.g., a pointer to a different node identified by "005" which is not depicted in FIG. 1B, for example a node corresponding to plan 112 of FIG. 1A). Alternately or additionally, the dialogue store data structure may include pointers from parent nodes to child nodes, and/or bidirectional pointers that bidirectionally link parent nodes and child nodes (e.g., by including a pointer from parent to child in the parent, and a pointer from child to parent in the child).

Accordingly, a path through the dialogue store data structure may be derived from any child node (e.g., a leaf node of a tree structure), by aggregating turns for that child node and backtracking through each of its ancestor nodes until the root turn node is reached. Furthermore, the dialogue structure may include one or more different root turn nodes, each representing different possible ways of starting a dialogue. For example, each root turn node may represent a different scenario, where the descendants of that root turn node (e.g., sub-tree or sub-graph descending from that root turn node) represent many different possible counterfactual dialogues relating to that scenario.

Optionally, in some examples, the dialogue store data structure may include one or more sets of top-level tags indicating particular dialogues, wherein a top-level tag includes an identifier and is linked to a particular turn, which may be interpreted as the final turn in some dialogue. Accordingly, the top-level tag indicates the entire dialogue leading up to that turn. For example, a set of top-level tags could indicate a particular training data set of annotated dialogues, annotated dialogues collected within a particular time frame, and/or any other suitable collection of annotated dialogues. As shown in FIG. 1B, the dialogue store data structure includes top-level tagged dialogues 190, which include references to the ID(s) of one or more nodes. The nodes that are referenced in the top-level tagged dialogues are the last turn(s) in respective dialogue(s), wherein ancestors of referenced nodes are interpreted as preceding turns in the same dialogue. For example, tagged dialogues 190 indicates the ID "006" corresponding to node 150 (e.g., indicating a dialogue leading from event 102 through the path including plan 104, result 106, event 108, plan 112, and result 114), as well as another ID "008" corresponding to another node not depicted in FIG. 1B.

When a conversational computing interface is configured to process multiple different paraphrases in an equivalent fashion, it may be advantageous to represent the multiple different paraphrases as related nodes in a more general graph data structure (e.g., a DAG) wherein all of the related nodes have a common descendent, e.g., a subsequent turn or sequence of turns that would occur the same way for all of the different paraphrases. Accordingly, the dialogue store data structure may include suitable graph data structures (e.g., DAGs) for representing the common descendent. In other examples, the dialogue store data structure may be restricted to only include tree data structures. It is believed that a dialogue store data structure implemented using only tree data structures may achieve many or all of the advantages described herein, while also potentially increasing computational efficiency of the implementation.

The dialogue store data structure may be represented in computer storage in any suitable fashion. As an example, a tree or graph structure may be represented via pointers, wherein a node of the structure is stored as a turn record including details of a particular turn (e.g., events, plans, results, and/or metadata) with pointers to parents and/or children of the node. Alternately, a tree or graph structure may be represented via a dictionary data structure (e.g., a hash table), in a data exchange format (e.g., in JavaScript object notation (JSON)) or in any other suitable fashion. Turn records include any suitable details about a turn, e.g., a trace and/or any suitable description of events, plans that were generated and optionally executed by a conversational computing interface, and/or results of executing such plans. In some examples, turn records may be stored in an immutable format, in a turn record store. Accordingly, the turn record store may support operations for adding new turns, creating modified copies of turns, and/or retrieving turns based on a turn identifier and/or search criteria. Content in the dialogue store data structure may be addressed/indexed in any suitable fashion. For example, the dialogue store data structure may include, in addition to a tree/graph data structure, a set of tags representing particular dialogues of interest. Accordingly, each tag may include, for example, a pointer to a child node that represents a final occurrence in such a dialogue of interest. Alternatively or additionally, each node may have an associated identifier that may be addressed to find a particular turn and/or one or more dialogue(s) including the turn. The dialogue store data structure may be traversed (e.g., using any suitable graph and/or tree search algorithm(s)) to find particular turns, e.g., to find turns occurring in one or more related dialogues, and/or to find turns satisfying a criterion.

The dialogue store data structure described herein may represent various relationships between different dialogues. For example, dialogues having a common prefix share one or more parents in the tree. Similarly, multiple different counterfactual turns may be represented by multiple different child turns (e.g., one for each alternative plan for responding to an event, or one for each possible event that may occur) of a common parent turn (e.g., the event, or a preceding trace). As another example, multiple different unexecuted alternative plans may be stored in the dialogue store data structure, as counterfactual turns that have a common parent turn. For example, an event in an annotated dialogue may be annotated with two or more different alternative plans that may be suitable for responding to the event (e.g., the event may be a common parent turn of the two or more different alternative plans). In some examples, an unexecuted alternative plan may be maintained in the dialogue store data structure, even if the unexecuted alternative plan may never be executable due to requiring a specific context for execution that may not recur. As an example, an unexecuted alternative plan for sending an email may never be executed, because once a first email was already sent, it may no longer be appropriate to send a second, alternative email. As another example, an unexecuted alternative plan for purchasing airline tickets may not be executed even if a user wishes to purchase airline tickets, for example if airline tickets indicated by the unexecuted alternative plan are no longer available. Nevertheless, it may be advantageous to maintain such unexecuted alternative plans even if they may be inapplicable, for example so that a human engineer or human demonstrator may validate the unexecuted alternative plan to indicate that it should be used as training data, to refer to the unexecuted alternative plan, to adapt the unexecuted alternative plan to a different context, etc.

The dialogue store data structure may permit the efficient implementation of various primitive and/or complex operations for maintaining and/or accessing information held within the dialogue store data structure. For example, the dialogue store may permit read operations and write/modify operations. For example, primitive read operations may be implemented to enable querying the dialogue store data structure to find all ancestors and/or descendants of a node (e.g., all turns that occurred before a node, and/or all turns that could occur after the node). As an example, finding all of the descendants of a particular node enables finding all of the dialogues that share a common prefix. As another example, primitive read operations may be implemented for filtering nodes to find turns having particular qualities, for example finding all descendants of a node that satisfy a criterion with regard to metadata, events, plans, and/or results, etc.

Branching dialogues as described herein (e.g., branching dialogues implemented using the dialogue store data structure of the present disclosure) may be used by conversational computing interfaces in any suitable manner. For example, as described herein, branching dialogues may be used for configuring a conversational computing interface (e.g., via machine-learning training on training data comprising a plurality of multi-turn conversations represented by a branching dialogue).

Figure 1C:
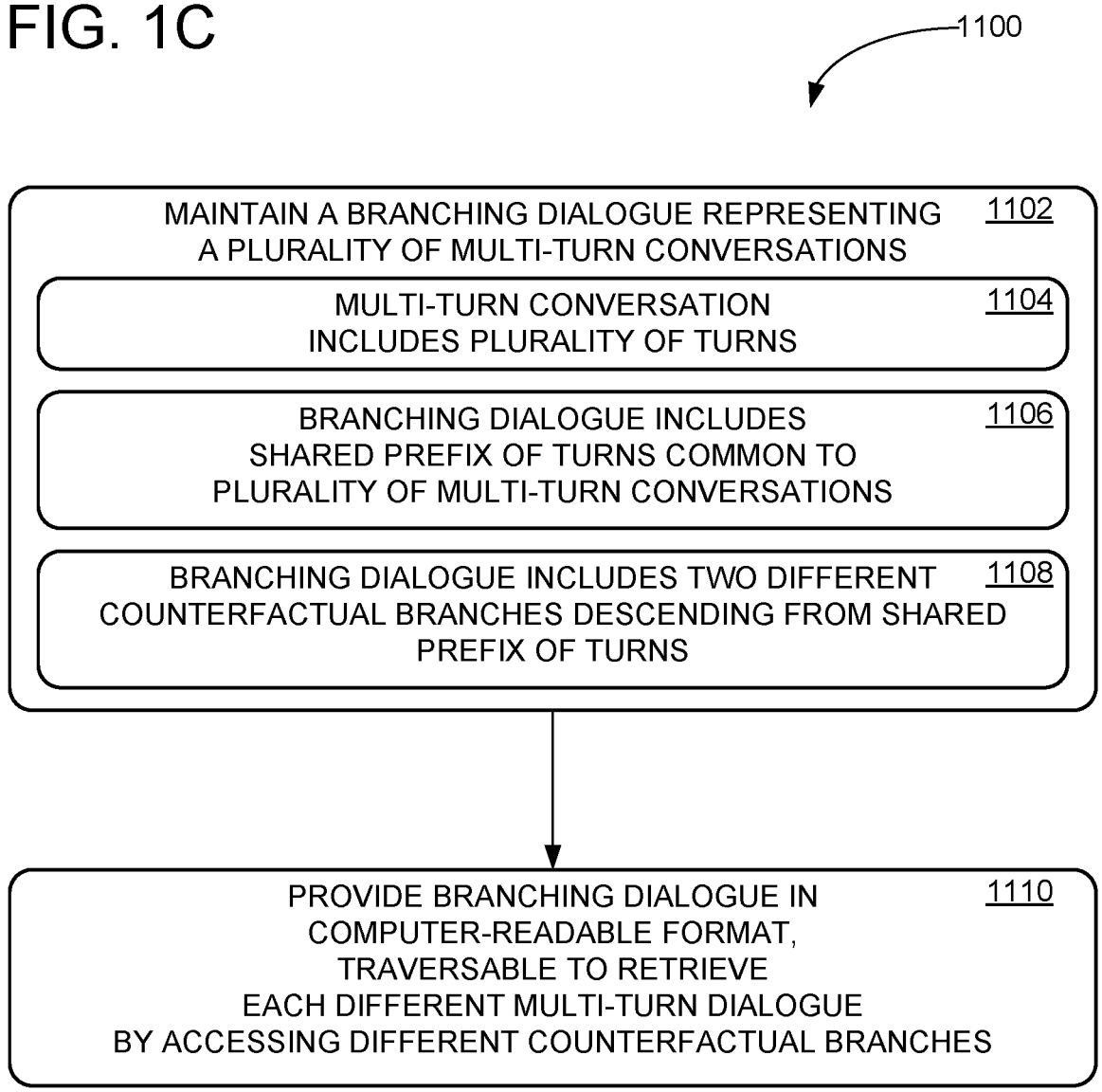
FIG. 1C shows an exemplary method for providing a branching dialogue.

FIG. 1C illustrates an exemplary method 1100 for providing a branching dialogue. At 1102, method 1100 includes maintaining a branching dialogue representing a plurality of multi-turn conversations. In some implementations, method 1100 may be enacted by a computer processor and the branching dialogue may be maintained on a computer storage device associated with the computer processor. In some implementations, the branching dialogue may be maintained in a computer-readable format, for example, in a dialogue store data structure according to the present disclosure.

As illustrated at 1104, each multi-turn conversation in the branching dialogue may include a plurality of turns, wherein a turn indicates any suitable aspects of a conversation as described herein. For example, a turn may include one or more conversation events, conversational computing interface actions (e.g., computer-executable plans), results, and/or traces. As a non-limiting example, a turn may indicate one or both of a conversational computing interface action and a conversation event.

As illustrated at 1106, a branching dialogue may include a shared prefix of turns common to a plurality of different multi-turn conversations. The shared prefix of turns comprises those turns that may occur in each different multi-turn conversation.

As illustrated at 1108, different multi-turn conversation may further include additional turns that are associated with the multi-turn conversation and not in the shared prefix, representing different counterfactual possibilities that are specific to the different multi-turn conversation. Accordingly, the branching dialogue may include at least two different counterfactual branches descending from the shared prefix of turns, wherein each different counterfactual branch includes one or more descendent turns that correspond to a different multi-turn conversation of the plurality of multi-turn conversations.

The branching dialogue may be used in any suitable manner for configuring a conversational computing interface. Accordingly, at 1110, method 1100 further includes providing the branching dialogue in a computer-readable format, traversable to retrieve each different multi-turn dialogue by accessing a corresponding different counterfactual branch. The branching dialogue may be provided to the conversational computing interface and/or to any other computing system. In some examples, the branching dialogue may be provided to human users by visually presenting the branching dialogue in a dialogue GUI, as is described in further detail below. The branching dialogue may be provided in any suitable computer-readable format, for example according to the dialogue store data structure of the present disclosure. The branching dialogue, in the computer-readable format, is traversable to retrieve a particular multi-turn conversation of the plurality of multi-turn conversations, wherein the particular multi-turn conversation is represented by the shared prefix of turns and a particular counterfactual branch including descendent turns that correspond to the particular multi-turn conversation. Each different multi-turn conversation in the plurality of multi-turn conversations corresponds to a different counterfactual branch having a particular set of descendent turns. Accordingly, the branching dialogue may be traversed to retrieve each of the different multi-turn dialogues, based on accessing different counterfactual branches.

Figure 2B:
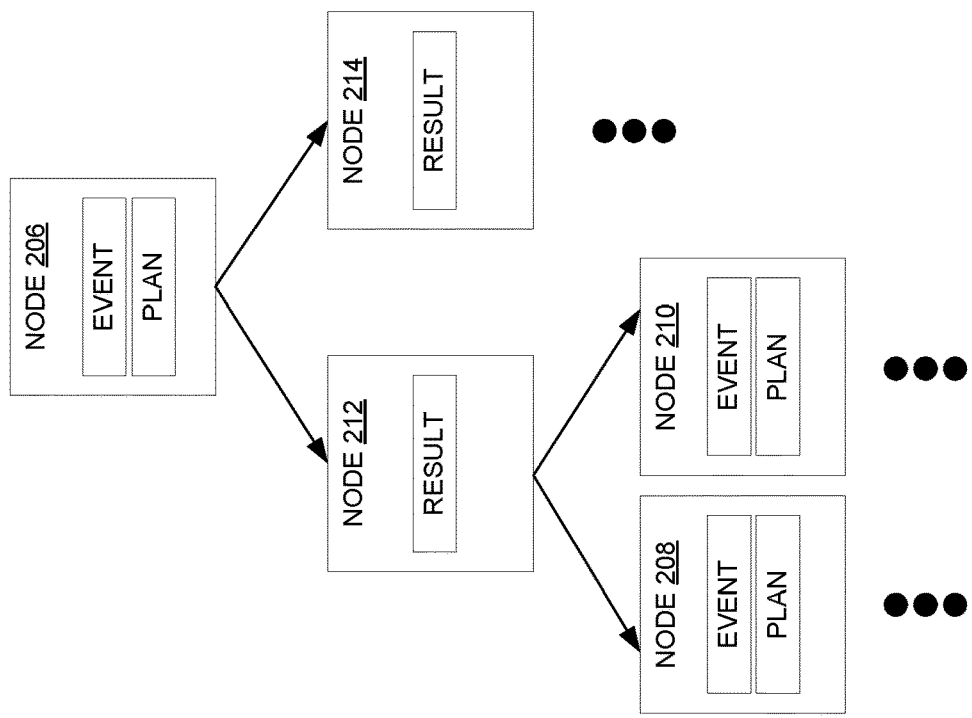
FIGS. 2A-2D show exemplary representations of turn structure in nodes of a dialogue store data structure.
Figure 2A:
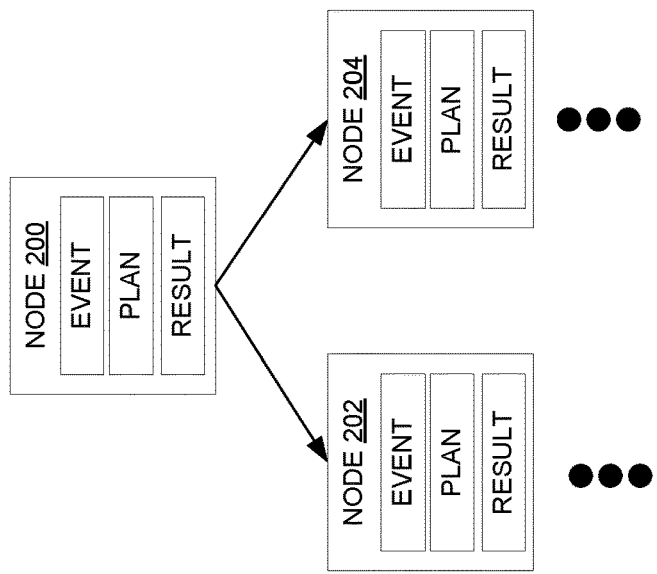

In some examples, as shown in FIG. 2A, dialogues in the dialogue store data structure include turn nodes wherein each turn node includes an event, a plan, and a result (e.g., as with turn node 200, 202, and 204). Accordingly, the dialogue store data structure may represent branching dialogues wherein different events may possibly occur at each turn (e.g., different events as the root node of a conversation, and/or different events occurring after any result occurs, as with nodes 202 and 204 that occur after the results of node 200). As depicted by the ellipses, the dialogue store data structure may include further nodes subsequent to nodes 202 and 204. Accordingly, the dialogue store data structure may be extended by adding a new turn including an event, a plan, and a trace of results, subsequent to any other node in the dialogue store data structure, for example by defining a new node record including a parent pointer pointing to such other node in the dialogue store data structure as described with regard to FIG. 1B.

In some examples, dialogues in the dialogue store data structure include alternating layers of two or more different kinds of turns. For example, FIG. 2B includes two different kinds of turns, including a first kind of turn related to plans and comprising one or more events and one or more plans for responding to the events (as with nodes 206, 208, and 210), and a second kind of turn related to results and comprising a trace of results occurring from executing a plan (as with nodes 212 and 214). Accordingly, the dialogue store data structure may represent branching dialogues wherein different results may be obtained from executing a plan responsive to an event. Accordingly, a dialogue may be expanded with a new plan, by specifying a parent trace turn, a triggering event that triggers generation and/or execution of the new plan, and the new plan (e.g., as a data-flow program fragment). The dialogue may be expanded with a new trace, by specifying a parent plan turn, and a resulting trace related to the execution of a plan in the parent plan turn. In some examples, adding a turn with an identical plan/trace to an existing turn may be disallowed, and accordingly, attempting to add a turn including such an identical plan/trace may result in no modification to the dialogue store data structure and optionally, the attempt may be configured to return an identifier of an existing turn having the identical plan/trace. In some examples, attempting to add a turn with an identical plan/trace may result in updating an existing turn with new events and/or metadata, for example to add more events that could trigger a particular plan, or to indicate that a particular trace occurs when a plan is executed with a new system version.

Figure 2D:
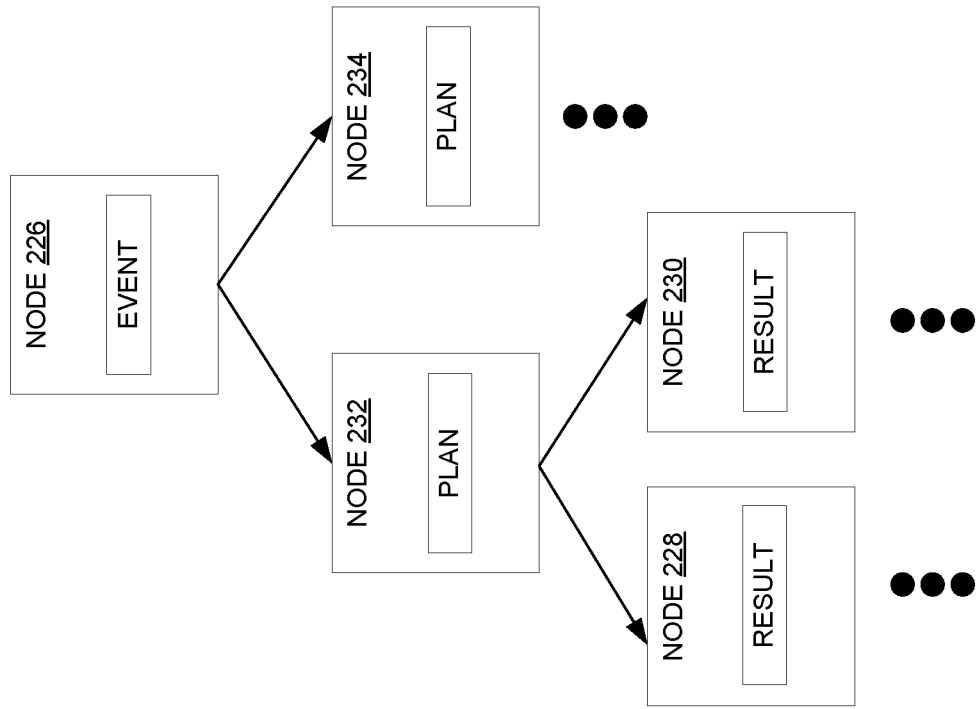
Figure 2C:
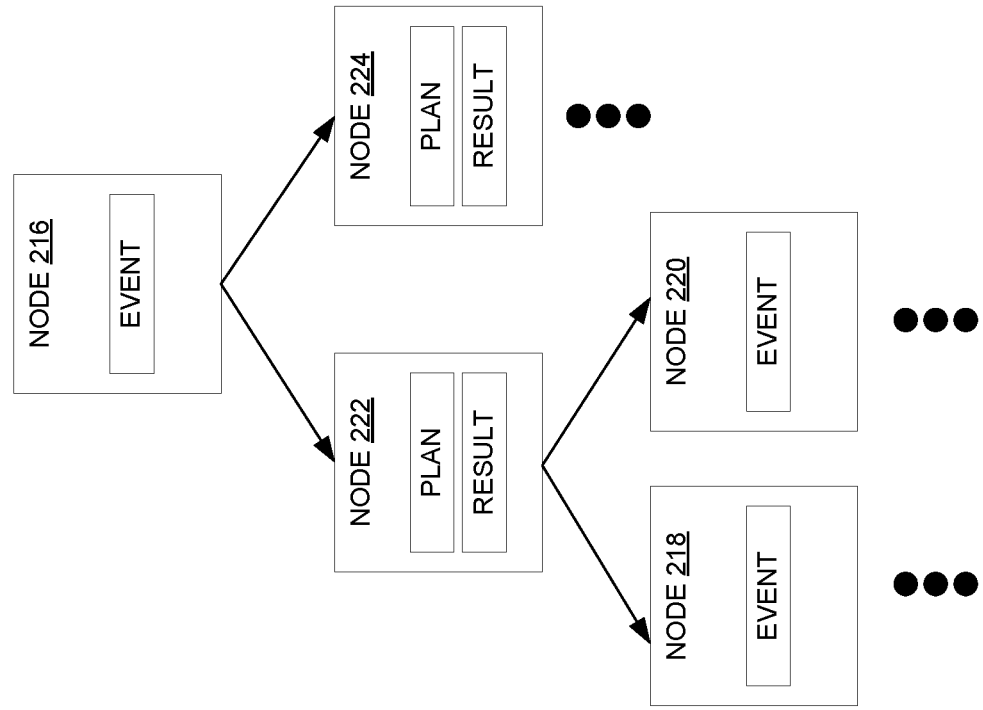

Alternately, as shown in FIG. 2C, two different kinds of turns in the dialogue store data structure may store either events (e.g., as with nodes 216, 218, and 220), or alternately may store plans and results (e.g., as with nodes 222 and 224). The two different kinds of turns for events and for plans/results may be convenient for representing annotated dialogues, for example by representing input utterances provided by a human user in turns storing events, and representing annotations indicating suitable responses to the input utterances in turns storing plans/results. For example, the dialogue store data structure may represent branching dialogues wherein different alternative plans may be generated for an event (e.g., plans in nodes 222 and 224 are generated for the event in node 216), and wherein multiple different events may occur at the start of the dialogue and/or after the results of executing a plan (e.g., as with the events in nodes 218 and 220, which may occur after executing the plan in node 222).

Alternately, dialogues in the dialogue store data structure may include three or more different kinds of turns. For example, nodes may be arranged in layers alternating in sequence between events, plans, and results, as shown in FIG. 2D. For example, FIG. 2D shows a dialogue store data structure that may represent a branching dialogue in which different plans may be generated for an event (e.g., as with the plans in nodes 232 and 234 generated for the event in node 226), different results may occur from executing a plan (e.g., as with results in node 228 and 230 which may occur from executing the plan in node 232), and/or different events may occur at the start of the dialogue and/or after executing a plan (not depicted in FIG. 2A). A similar arrangement is depicted in FIG. 1D, which includes events, plans, and results stored in alternating layers.

In some examples, turns in the dialogue store data structure may include any suitable metadata (e.g., frequency metadata or any other metadata as described above). For example, annotations may be defined at least in part by metadata, for example, an annotation including a plan for responding to an event may further include metadata indicating user satisfaction with the plan. In some examples, turns include circumstance metadata describing circumstances in which a turn occurred. For example, circumstance metadata may be defined by immutable values describing a context for a conversational computing interface such as a software version, model version (e.g., how recently the model was updated via training), and/or any other relevant information such as time stamp information, provenance indication (e.g., whether a plan originated from a human demonstrator, human engineer, or system prediction).

In some examples, a branching dialogue may indicate sampling frequencies for different turns and/or counterfactual branches in the branching dialogue. In some examples, a branching dialogue may include metadata indicating a sampling frequency with which a corresponding counterfactual branch occurs, in a distribution of exemplary multi-turn conversations. For example, the distribution of exemplary multi-turn conversations may be an empirical distribution of observed multi-turn conversations, and/or a training distribution of multi-turn conversations for machine-learning training.

For example, each turn may be annotated with a sampling frequency associated with that turn and/or with a counterfactual branch corresponding to that turn. Sampling frequencies may indicate a frequency of occurrence associated with a counterfactual branch. In some examples, a sampling frequency may indicate an empirical frequency of occurrence of the counterfactual branch, e.g., an empirical frequency of occurrence of the multi-turn conversation represented by that counterfactual branch in real-world data of conversations between humans and conversational computing interfaces. In some examples, a sampling frequency may indicate a frequency of occurrence for use in machine-learning training, e.g., thereby determining a suitable distribution of different counterfactual branches for training. Sampling frequencies may be any suitable values (e.g., frequency counts, probability values, likelihood values, confidence values, salience values, relevance values, or any other suitable value that may indicate how frequently to sample a counterfactual branch during training or for any other suitable purpose). Sampling frequencies may be used for machine-learning training a conversational computing interface with training data sampled from a distribution of different exemplary multi-turn conversations of a plurality of multi-turn conversations in a branching dialogue, wherein the sampling is based on the sampling frequencies.

Sampling frequencies may be stored in any suitable data format (e.g., numeric data, such as floating point data, fixed-point decimal data, integer data, or any other suitable representation of real-numbered frequency values). In some examples, frequencies for sets of different turns, counterfactual branches, and/or multi-turn conversations may form a probability distribution (e.g., each frequency value may be between 0 and 1, such that the different frequency values in the set sum to 1). For example, at each branch in the branching dialogue, the frequency values for the different possible paths may sum to 1.

In some examples, frequencies may correspond to the graphical structure of the branching dialogue. For example, in a branching dialogue having a tree structure, the frequency of occurrence for a particular turn may be proportional to a product of frequencies of each preceding turn from which that turn descends. Accordingly, by sampling different counterfactual branches according to the frequency values, particular turns and/or multi-turn conversations may be sampled according to a probability distribution indicated by the frequency metadata. The branching dialogue may include one or more different sets of frequency values, for example indicating frequency of empirical occurrence in different time frames, populations, and/or regions, indicating a desired frequency of occurrence in a distribution for machine-learning training, etc.

In some examples, sampling frequencies may be derived from an empirical distribution of frequency of occurrence of different counterfactual branches. In some examples, sampling frequencies may be adjusted in any suitable manner, for example to achieve a desired frequency of occurrence in a distribution for machine-learning training. As an example, frequency of occurrence for training may be adjusted based on estimating relevance of particular counterfactual branches (e.g., alternately or in addition to being based on empirical frequency of occurrence). For example, frequency of occurrence may be increased for examples that represent difficult cases during training (e.g., counterfactual branches for which a machine learning model achieves a low accuracy score). In some examples, frequency of occurrence may be adjusted based on user feedback (e.g., based on receiving user feedback indicating that an example is particularly important or not particularly important).

As another example, metadata may indicate whether an annotation or portions thereof (e.g., a particular plan included in a turn) should be used for training (e.g., whether the plan is a viable exemplary plan, or is a counterfactual plan and/or any other plan that may not be appropriate). For example, a branching dialogue may include a counterfactual branch corresponding to an erroneous outcome, and metadata labelling the erroneous outcome. As an example, an erroneous outcome may include a state in which a user reported dissatisfaction, a state in which a conversational computing interface was unable to fulfill conditions required for carrying out an action, and/or a state in which a type error, API error, or any other error occurred due to executing computer-executable code of the conversational computing interface. In some examples, a conversational computing interface may be machine-learning trained to avoid erroneous outcomes. Alternately or additionally, the conversational computing interface may be trained to handle errors after they occur. For example, the branching dialogue may further include a turn including a corrective conversational computing interface action for correcting the erroneous outcome. Accordingly, the conversational computing interface may be machine-learning trained based on the erroneous outcome and the corrective conversational computing interface action, for example by configuring the conversational computing interface to respond to the erroneous outcome based on the corrective conversational computing interface action.

In some examples, results of user interactions with a live conversational computing interface (e.g., user feedback regarding user satisfaction) may be used as metadata indicating whether predicted plans by the conversational computing interface are appropriate or inappropriate/incorrect. Furthermore, if a plan is indicated incorrect (e.g., if a prediction error occurs regarding an appropriate plan for a particular event), the conversational computing interface may be configured to immediately generate one or more alternative plans (e.g., so as to execute a more appropriate plan). Alternately or additionally, any inappropriate plan(s) in the dialogue store data structure may be annotated as inappropriate for use in training for error recovery (e.g., using the DAgger™ algorithm). In some examples, training for error recovery may include training on a dialogue that includes an inappropriate plan (e.g., a plan that resulted in user dissatisfaction) and, in a subsequent turn, a plan configured to correct mistakes that may have occurred due to executing the inappropriate plan. For example, if a user requests to create a meeting with "Andy" and in response, a conversational computing interface executes a plan to create a meeting with "Jon," the user may indicate dissatisfaction and/or correct the conversational computing interface by saying, "I said Jon." Accordingly, the conversational computing interface may be configured to execute a subsequent, corrective plan to correct the mistake, for example by executing a new plan including inviting Andy to the meeting instead of Jon and apologizing for the mistake, for example by outputting an utterance saying "Sorry about that. I've added Jon to the meeting and removed Andy."

Turns (e.g., plan turns, trace turns, and/or any other event/plan/result/trace information related to a turn, as well as any accompanying metadata) may be stored in any suitable format, for example according to any suitable serialization procedure. For example, turns may be stored in a normalized format as a sequence of bytecode instructions.

In some examples, the dialogue store data structure may be constructed and/or maintained via a predefined set of primitive write/modify operations. As an example, the dialogue store data structure may be configured for creating a new dialogue including a root turn. As another example, the dialogue store data structure may be configured for extending a dialogue with a subsequent turn. For example, to insert a turn at the end of a dialogue, a new turn may be defined and saved in the dialogue store data structure and recorded in a new node including a pointer to a parent turn that occurred before the new turn. For example, returning briefly to FIGS. 1A-1B, while constructing the dialogue shown in FIG. 1A, the result 114 may be inserted into the dialogue by defining a record for node 150 as shown in FIG. 1B, including a pointer 154 back to a parent node indicated by the identifier "005".

Figure 3D:
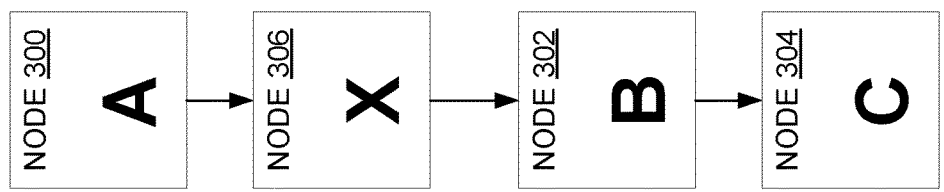
FIGS. 3A-3D show exemplary implementations of an insert operation for a dialogue store data structure.
Figure 3C:
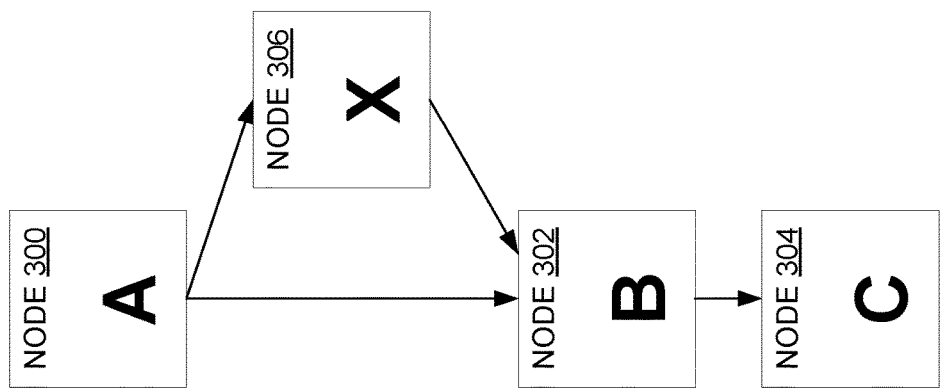
Figure 3B:
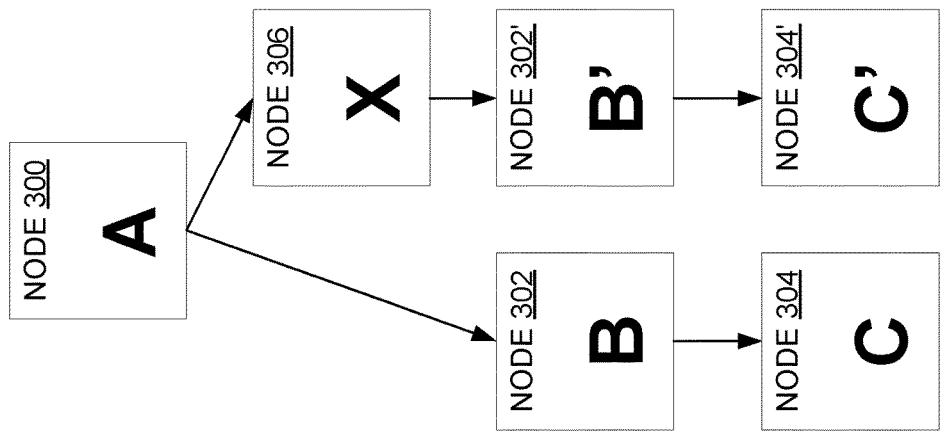
Figure 3A:
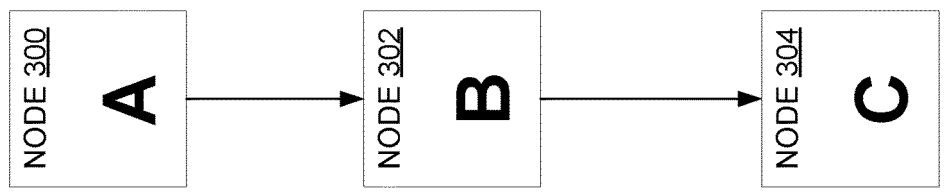

As another example, to insert a turn in the middle of a dialogue between a prefix sequence of turns and a suffix sequence of turns, a new turn may be defined and saved, and recorded in a new node including a pointer to a parent turn at the end of the prefix sequence of turns. For example, FIG. 3A shows an initial dialogue including nodes 300, 302, and 304, and FIGS. 3B-3D show different approaches to adding a new node 306 to the dialogue representing a new turn between the nodes 300 and 302. The contents of nodes in FIG. 3A-3D are depicted as single letters for simplicity, but the nodes may include any suitable events/plans/results/traces, wherein the letters broadly indicate different contents of different turns. As shown in all of FIGS. 3B-3D, the new node 306 descends from node 300. The arrows descending from parent nodes to child nodes (e.g., the arrow from node 300 to node 302) may represent the descendance relationship in any suitable fashion, for example, the arrow from node 300 to node 302 may represent a pointer in node 302 pointing back to node 300.

In some examples, as shown in FIG. 3B, the dialogue store data structure may be further extended with a copy of each node in the suffix sequence of turns, for example, wherein the first such copied node corresponding to the turn immediately after the inserted node includes a pointer back to the inserted node. For example, FIG. 3B depicts copied node 302' based on node 302 and copied node 304' based on node 304, where node 304' points back to node 302' and in turn, node 302' points to the new inserted node 306. Accordingly, after inserting the new node, the dialogue store data structure includes both 1) the original path (as it existed before inserting the new node), and 2) the new path with the new node (e.g., a copy of the original path wherein the new node is inserted).

Alternately, as shown in FIG. 3C, instead of copying the suffix sequence of turns, a node corresponding to the first turn in the suffix sequence may be mutably modified to point to both of the inserted node, and its original parent (e.g., the last node in the prefix sequence of turns), thereby representing both 1) the original path and 2) the new path with the new node, in the form of a DAG. For example, FIG. 3C includes a path from node 300 to node 306 and in turn to node 302, as well as a path straight from node 300 to node 302. As described above, these paths may be represented in any suitable fashion, e.g., node 302 may include a parent pointer back to node 300, and when node 306 is added node 302 may be modified to include an additional parent pointer back to node 306 (e.g., so that node 302 has two parents, nodes 300 and 306). The DAG shown in FIG. 3C corresponds to the same paths shown in the tree illustrated in FIG. 3B, but an insertion operation implemented in this fashion may require less computer processor bandwidth and/or less computer storage space (e.g., because there is no need to copy nodes from the suffix sequence of turns).

Alternately, as shown in FIG. 3D, instead of copying the suffix sequence of turns, the node corresponding to the first turn in the suffix sequence may be mutably modified to point back to the inserted node instead of to its original parent (e.g., the last node in the prefix sequence of turns), thereby replacing the original path with the new path including the new node. For example, in FIG. 3D, node 306 is added as a descendent of node 300 (e.g., by modifying node 306 to include a parent pointer to node 300) and node 302 is modified to be a descendent of node 306 instead of a descendent of node 300 (e.g., by modifying a parent pointer in node 302 to point to node 306 instead of to node 300).

Branching dialogues may be configured to permit accessing and/or modifying multi-turn conversations of a branching dialogue in any suitable computer-readable format according to various data structure implementation techniques. In some examples, multi-turn conversations may be substantially immutable, so that a multi-turn conversation in the branching dialogue is not deleted or modified after addition to the branching dialogue. In other examples, multi-turn conversations may be mutably modified.

For example, with regard to inserting a new node into a branching dialogue, FIG. 3B shows an approach in which multi-turn conversations are immutable. In the approach of FIG. 3B, modifications to a multi-turn conversation are recorded in a copy of that conversation. FIG. 3C shows another approach in which a multi-turn conversation may be mutably modified by inserting a node, while preserving the original multi-turn conversation so that both the original multi-turn conversation and modified multi-turn conversation form different paths in a directed acyclic graph. FIG. 3D shows another approach in which multi-turn conversations are mutably modified.

In addition to mutable and/or immutable approaches for inserting nodes into a branching dialogue as shown in FIGS. 3A-3D, any suitable approach may be used for implementing any other operations for a branching dialogue. For example, a mutable and/or immutable approach may be implemented for editing a turn of a multi-turn conversation in the branching dialogue.

The techniques of the present disclosure may be used to implement various commands for modifying branching dialogues. For example, a dialogue store data structure according to the present disclosure may implement any suitable operations for modifying branching dialogues according to the various examples presented herein. Accordingly, a computer device holding a branching dialogue may be configured to receive a command to modify the branching dialogue. Responsive to receiving the command to modify the branching dialogue, the computer device may be configured to traverse the branching dialogue, to locate a previously-defined multi-turn conversation, and to record a modification to the branching dialogue based on the received instruction and the previously-defined multi-turn conversation. For example, when branching dialogues are stored in a computer-readable format in a dialogue store data structure, operations of the dialogue store data structure may be configured for such traversal and/or modification of branching dialogues in the dialogue store data structure.

In some examples, commands to modify a branching dialogue may be received from a human user, for example via a dialogue GUI (e.g., dialogue GUI 400 as described with regard to FIG. 4, below). For example, a computer device maintaining the branching dialogue may be configured to visually present the dialogue GUI via a display device. Alternately or additionally, the computer device maintaining the branching dialogue may be configured to communicatively couple with another development computer and to provide the dialogue GUI to the development computer via such communicative coupling.

As described above, commands for modifying the branching dialogue may be received from various sources (e.g., human user via GUI, and/or operations associated with a dialogue store data structure). Accordingly, the branching dialogue may be updated according to received commands. For example, based on a command to modify a turn of a first multi-turn conversation of a plurality of multi-turn conversations in a branching dialogue, the branching dialogue may be updated by recording a modification to the branching dialogue in the computer-readable format. The modification may indicate the modified turn, while preserving the original version of the first multi-turn conversation (e.g., so that the branching dialogue still includes the first multi-turn conversation without any modification to the turn). Accordingly, the modification may include automatically adding a second, different multi-turn conversation to the branching dialogue in the computer-readable format, the second, different multi-turn conversation including the modified turn. In other words, the command to modify the first multi-turn conversation may trigger addition of the second, different multi-turn conversation to the branching dialogue in the computer-readable format. Thus, the branching dialogue may include both the first multi-turn conversation (e.g., without any modifications) and the second multi-turn conversation (e.g., based on the first multi-turn conversation and the modification to the indicated turn of the first multi-turn conversation). In other examples, multi-turn conversations may be mutably modified, e.g., by actually modifying the data corresponding to that turn in the first multi-turn conversation in the branching dialogue.

In some examples, operations for modifying one multi-turn conversation in the branching dialogue may be propagated to one or more other multi-turn conversations in the branching dialogue, for example based on the branching structure. For example, with regard to the branching dialogue shown in FIG. 3B, a modification to node 302 (B) may be similarly applicable to the similar node 302' (B'), based on the shared prefix formed by node 300 (A). Accordingly, based on a command to modify a turn of a first multi-turn conversation of the plurality of multi-turn conversations, a further modification of a branching dialogue in a computer-readable format may be recorded, and the modification may be automatically propagated (e.g., by functions of a dialogue store data structure implementation) to a second, different multi-turn conversation of the plurality of multi-turn conversations. In other words, a command to edit a first multi-turn conversation may trigger editing such first multi-turn conversation, and the same command may also trigger propagating an edit that was applied to the first multi-turn conversation to a second, different multi-turn conversation.

Modifications may be propagated when using a mutable or immutable approach as described above. For example, when using a mutable approach, based on the command to modify the turn of the first multi-turn conversation, a suitable modification may be recorded by mutably modifying the first multi-turn conversation in the branching dialogue in the computer-readable format. Accordingly, the modification may be automatically propagated to the second, different multi-turn conversation by also editing the second multi-turn conversation in the branching dialogue in the computer-readable format. As another example, when using an immutable approach, based on the command to modify the turn of the first multi-turn conversation, the modification may be recorded by immutably modifying the first multi-turn conversation. For example, the immutable modification may be implemented by creating a copy of the first multi-turn conversation (as described above with regard to modifying turns and/or inserting turns, e.g., as shown in FIG. 3A). The copy of the first multi-turn conversation indicates the edit to the first multi-turn conversation without mutably modifying the first multi-turn conversation. Accordingly, the modification may be automatically propagated by immutably modifying the second multi-turn conversation in a similar fashion. For example, the second multi-turn conversation may be immutably modified by creating a copy of the second multi-turn conversation, indicating the edit applied to the second multi-turn conversation.

Mutable and/or immutable operations may be implemented in any suitable fashion for a branching dialogue in a computer-readable format, for example as operations of the dialogue store data structure. For example, based on a command to modify a previously-defined multi-turn conversation, the dialogue store data structure may be configured to record a modification to the branching dialogue in the computer-readable format, wherein the modification automatically adds, to the dialogue store data structure, a new node having a parent pointer to a parent node, wherein the parent node is included in a prefix of turns of the previously-defined multi-turn conversation. In other words, a command may trigger the automatic addition, to the dialogue store data structure, of the new node having the parent pointer to the parent node in the prefix of turns of the previously-defined multi-turn conversation. Accordingly, a new multi-turn conversation corresponding to the new node may be recorded in the dialogue store data structure, without causing modification to the previously-defined multi-turn conversation, e.g., as shown in FIG. 3B. Alternately or additionally, adding the new node may effectively modify the previously-defined multi-turn conversation as shown in FIGS. 3C and/or 3D.

As another example of a primitive operation, the dialogue store data structure may be configured for tagging one or more turns with additional data/metadata. In some examples, the dialogue store data structure may be configured to prevent cyclical dialogues, and accordingly, if adding a turn would create a cyclical path in the underlying tree/graph structure, an attempt to add that turn may be prohibited and the attempt may return an indication of the other turns that would form the cyclical path.

In some examples, the dialogue store data structure may be further modified by one or more complex operators (e.g., operators defined by a sequence of one or more primitive write/modify operations). As an example, the dialogue store data structure may support a "reroute" operation configured to receive a dialogue identifier, a turn identifier, and data for a new turn (e.g., a new trace for the turn, and/or metadata for the turn), and to update the dialogue store data structure to include a new dialogue wherein the identified turn is replaced, within the identified dialogue, with the new turn defined by the data for the new turn. As an example, the reroute operation may be implemented by a combination of extend and/or tag operations. The reroute operation may be further configured to return an indication of any related dialogue identifiers, as a hint that the identified dialogues could also be retagged in a similar fashion. As another example, the dialogue store data structure may further support a fully automated reroute function that automatically retags the identified dialogs. As with other examples described herein, the reroute operation and/or fully automated reroute function may be configured to mutably modify turns and/or dialogues in the dialogue store data structure, and/or to create updated dialogues without modifying pre-existing turns/dialogues in the dialogue store data structure.

In some examples, write/modify operations to the dialogue store data structure may be stored in a persistent queue, instead of being immediately processed. In some examples, one or more worker computers may be configured to synchronously or asynchronously process write/modify operations to the data structure from the persistent queue. Furthermore, processing write/modify operations may include any suitable additional further processing of the data structure in addition to implementing the write/modify operations. For example, processing write/modify operations may include forwarding relevant information about the write operations to human annotators and/or providing the relevant information to training algorithms (wherein relevant information may include any suitable data and/or metadata, e.g., dialogues being modified by the write operations, turns being added by the write operations, and/or specific traces/events/plans/results being added by the write operations).

Figure 4:
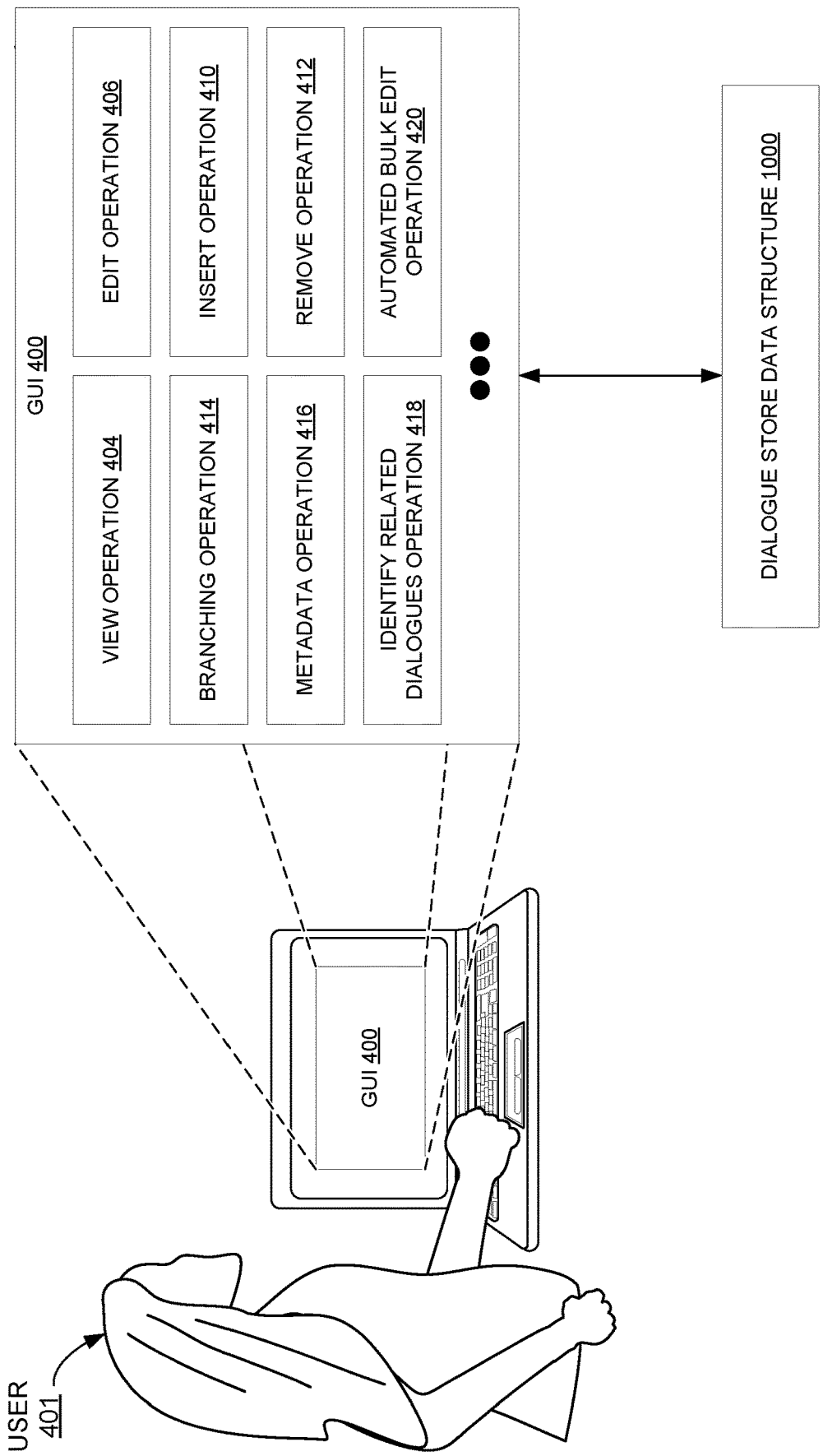
FIG. 4 shows an exemplary graphical user interface (GUI).

The above-described primitive operations may support any suitable editing operations to allow a user 401 to edit dialogues in the dialogue store data structure 1000, for example, in a dialogue GUI 400, as depicted in FIG. 4. For example, dialogue GUI 400 may be configured for viewing, editing, and/or otherwise accessing dialogues, including viewing/editing/accessing events in dialogues, and/or annotations of those events (e.g., including plans, results, traces, and/or metadata). The dialogue GUI 400 is configured to use the underlying dialogue store data structure 1000 to implement any suitable operations for viewing/editing annotated dialogues. As an example, the dialogue GUI 400 may support high-level operations such as a view operation 404 for viewing a dialogue, an edit operation 406 for editing a turn, insert operation 410 and remove operation 412 for editing a dialogue by adding/removing/replacing nodes, a branching operation 414 for copying a dialogue to edit a copy of the dialogue, a metadata operation 416 for editing metadata associated with a dialogue, an identify related dialogues operation 418 for identifying dialogues related to a dialogue being edited, and/or an automated bulk edit operation 420 for automatically editing dialogues related to a dialogue being edited. Alternately or in addition to the operations depicted in FIG. 4, the dialogue GUI 400 may also support any other suitable operations for viewing and/or comparing a plurality of dialogues, navigating the dialogue store data structure 1000 (e.g., according to an underlying graphical data structure, and/or via search queries). The dialogue GUI 400 may visually present dialogues for viewing in any suitable fashion. For example, when viewing a dialogue, the dialogue may be shown as a linear sequence of turns (e.g., omitting some of the information from the underlying graphical data structure such as alternative branches). In some examples, the dialogue GUI 400 may restrict editing operations to "append-only" operations that add data to the dialogue store data structure, without modifying the dialogues that are already stored. Alternately or additionally, the dialogue GUI 400 may permit mutable modification of stored dialogues. More generally, the dialogue GUI 400 may provide any suitable operations for manipulating and/or accessing the dialogue store data structure, for example as described with regard to FIGS. 1A-1B, 2A-2D, and/or 3A-3D. Append-only and/or mutable editing operations may be implemented in any suitable fashion, for example using the primitive and/or complex operations for accessing/maintaining the dialogue store data structure described above. The dialogue GUI 400 may be configured to expose any suitable operations for manipulating dialogue store data structure 1000. For example, dialogue GUI 400 may expose a limited set of operations that are designed to preserve integrity of the dialogue store data structure 1000 (e.g., operations for mutably and/or immutably editing the contents of the dialogue store data structure 1000, wherein each such operation is configured to guarantee that the resulting dialogue store data structure 1000 is in a valid state after editing).

As an example of a high-level editing operation, the dialogue GUI 400 may provide a view operation 404 for viewing a turn edit operation 406 e.g., by presenting events/plans/results of the turn in an editable graphical format (e.g., a flowchart), and/or by presenting a text editor interface displaying one or more events, plans, and/or results from the turn. As another example, the dialogue GUI 400 may provide an edit operation 406 for editing a turn, for example by showing the turn contents as editable text (e.g., as editable text strings corresponding to utterances, and/or editable code corresponding to plans/results). More generally, the dialogue GUI 400 may permit editing events/plans/results or any other trace features, and/or metadata, in any suitable fashion. In some examples, the editing GUI may be configured to save an edited turn by saving a copy, so that the original turn remains immutable and is not altered. In other examples, the dialogue GUI 400 may permit direct, mutable modification of a turn. In some examples, when editing a turn in the middle of a dialogue, subsequent turns in the dialogue may be copied and/or modified to depend on the edited turn. In some examples, saving an edited turn may include validating whether the edit preserves semantics of the turn (e.g., so that the edited turn achieves the same results as the original turn), before copying/modifying subsequent turns to depend on the edited turn.

As another example, the dialogue GUI 400 may permit a "branching" operation 414 to copy a dialogue, so as to edit a copy of the dialogue. For example, while a user 401 is viewing a dialogue, the dialogue GUI 400 may include a "branching" button that copies the dialogue being viewed and immediately opens the copy in the editor, so that the user 401 can edit the copy.

As another example, the editor GUI may provide a metadata operation 415 for viewing one or more dialogues and adding metadata to the dialogues, for example, to validate and/or version the dialogues to indicate whether the dialogues should be used for training. As another example, the editor GUI may permit adding metadata to indicate that a possible turn in a dialogue is a counterfactual turn that should be used for training as an example of a counterfactual approach that should not be taken, for example to train the conversational computing interface for error recovery.

More generally, the dialogue GUI 400 may permit any suitable modification of turns and/or dialogues, for example insert operation 410 and remove operation 412 configured to insert or remove turns in a dialogue. In some examples, the dialogue GUI 400 may include specialized versions of editing operations, for example to insert new events into a turn, to modify plans in a dialogue, etc. Any changes introduced via the editor GUI may be propagated into related dialogues using any of the approaches described above (e.g., copying all of the turns that occur after an edited/inserted turn, mutably modifying turns).

In some examples, the dialogue GUI 400 may be configured with an identify related dialogues operation 418 to automatically identify any other dialogues that may be related to a dialogue being edited. For example, when a dialogue is edited the dialogue GUI 400 may present a list of related dialogues that share a common ancestor in an underlying graphical data structure of the dialogue store data structure, and/or a list of dialogues that satisfy similar criteria with regards to metadata/turn contents, etc. In some examples, a user may wish to edit a plurality of related dialogues in a similar fashion. Accordingly, the list of related dialogues may be used to provide the user 401 with a "guided tour" of related dialogues for performing the edits. In some examples, the dialogue GUI 400 may be configured with an automated bulk edit operation 420 so that bulk editing of the related dialogues may be substantially automated, for example by asking the user 401 whether to automatically apply the same edit to all of the related dialogues in a uniform fashion, by automatically showing the user 401 the related dialogues in sequence and asking the user whether to apply the edit to each dialogue individually, etc. In some examples, the GUI editor may be configured to support an "autocomplete" operation wherein, as a human user edits a particular dialogue, the GUI is configured to visually present one or more related dialogues such as dialogues that share a prefix and include a suffix that may be of interest for adding turns to the particular dialogue, etc.

The features described herein are exemplary in nature, and the dialogue store data structure may be similarly implemented for other conversational computing interfaces. For example, the techniques described herein may be used to implement a dialogue store data structure for a conversation system that defines multi-turn annotated dialogues with any other suitable representation for turns (e.g., instead of traces, events, plans, and/or results). The dialogue store data structure permits representation of counterfactual dialogues, wherein the dialogue has a branching structure due to multiple possible outcomes for a particular turn (e.g., multiple different events, multiple different plans, and/or multiple different results). The dialogue store data structure may represent one or more different counterfactual dialogues, for example, each counterfactual dialogue may represent many different possible outcomes for a particular scenario.

The techniques described herein may permit maintaining a suitably large/diverse distribution of exemplary annotated dialogues to facilitate training a conversational computing interface to improve performance of the conversational computing interface (e.g., performance with regard to accuracy of selecting appropriate plans for events, user satisfaction, efficiency of training of the conversational computing interface with regard to training time and/or amount of data required, and/or any other suitable measure of performance). As an example, performance may be improved by training on a distribution of exemplary annotated dialogues that includes a wide variety of different possibilities (e.g., different events, plans, and/or results). Alternately or additionally, performance may be improved by training on a distribution of exemplary annotated dialogues that is similar to a distribution of actual dialogues that occur during live operation of the conversational computing interface (e.g., the distribution of exemplary annotated dialogues is similar to a real or hypothetical distribution of actual dialogues from interaction with human users). Accordingly, many conversational computing interfaces are configured to maintain and/or access a large plurality of different annotated dialogues for training, wherein each annotated dialogue is an atomic unit (e.g., a computer file or data structure) including events, plans, and/or results, as well as optional metadata (e.g., information regarding the provenance of the dialogue from real usage, human demonstrators, and/or simulation).

As compared to approaches in which annotated dialogues are maintained as atomic units, the approach described herein using the dialogue store data structure may reduce data maintenance cost of annotated dialogue data. For example, if conventions for annotation data change over time (e.g., different metadata, different format for events, plans, results, and/or traces), the approach described herein may enable incremental updating of the dialogue store data structure to include new examples that adhere to the new conventions, whereas an approach in which dialogues are maintained as atomic units may require relabeling/rewriting each of the different atomic units (e.g., increasing computational expense and/or conceptual difficulty).

The dialogue store data structure described herein may achieve the above-described benefits during training, maintenance, and/or live operation of any suitable conversational computing interface. The conversational computing interface may be trained to take specific actions in response to different kinds of events, for example, to respond to a user request by outputting speech utterances via a speaker, and/or to interact with other computer technologies via APIs to find search results, make purchases, schedule appointments, etc. The conversational computing interface may be trained in any suitable fashion based at least on annotated dialogues, for example, by supervised training wherein the conversational computing interface is trained to achieve similar results to the annotated dialogues, and/or by reinforcement learning wherein the conversational computing interface is trained to assess the likely utility of different possible actions based on feedback regarding the actual utility of different possible outcomes that occurred in annotated dialogues and/or during live operation of the conversational computing interface. The examples described herein are non-limiting, and the conversational computing interface may be trained on annotated dialogues in any suitable fashion, for example using any suitable combination of state-of-the-art and/or future machine learning (ML), artificial intelligence (AI), and/or natural language processing (NLP) technologies.

Annotated dialogues may be obtained for addition to the dialogue store data structure in any suitable fashion. As a non-limiting example, annotated dialogues may be obtained from human demonstrators who are tasked with providing exemplary events (e.g., user utterances in the form of speech and/or text, button presses), and/or annotating exemplary events to indicate actions that should be taken by a conversational computing interface. As described above, annotations may include any suitable plans, results, and/or metadata associated with an event. For example, the annotations may include a human-authored plan for responding to an event (e.g., a plan represented in the form of executable code, flow-charts, conversational templates, or in any other suitable manner). Alternately or additionally, the annotations may include specific outcomes that should occur when responding to the event (e.g., specific output utterances that should be produced by a conversational computing interface, specific results of API calls). Human users may be asked to provide annotations in any suitable fashion. For example, human users may be asked to author a plan by directly authoring executable code. In other examples, human users may be asked to author a plan by using a GUI tool to indirectly author executable code, for example by selecting possible system actions from a drop-down memory, editing a graphical flow-chart, etc. In other examples, human demonstrators may be asked to author a plan by acting as a stand-in for an automated agent, for example by selecting actions to take in response to a user utterance, sometimes referred to as a "Wizard-of-Oz" approach.

Conversational computing interfaces may be trained on a plurality of different annotated dialogues obtained in different manners (e.g., direct authoring, GUI authoring, and/or Wizard-of-Oz). The different annotated dialogues may be obtained from different populations of human users (e.g., as a non-limiting example, annotated dialogues may be obtained from engineers who may be asked to directly author executable code, from trained demonstrators who may be asked to author a plan via a GUI tool, and/or from minimally-trained and/or untrained users who may be asked to provide example actions in a "Wizard-of-Oz" system). In some examples, annotated dialogues may be obtained by operating a "live" conversational computing interface and collecting user feedback regarding performance of the system, e.g., to assess a user satisfaction for different dialogues that occur so as to annotate the dialogues based on the assessed user satisfaction.

In some examples, conversational computing interfaces may be trained on a large plurality of different variations on one or more dialogues collected by repeatedly collecting multiple different counterfactual alternatives for one or more turns in the dialogue. For example, the counterfactual alternatives may be collected by finding, for an exemplary turn, one or more semantically related turns (e.g., versions of the same turn with utterances by humans and/or utterances output by a conversational computing interface being paraphrased, versions of the same turn including utterances about different related topics, versions of the same turn including alternative plans for responding to an utterance). Semantically related turns may be obtained using any of the above-described techniques, for example, by providing the exemplary turn to a human demonstrator and asking the human demonstrator to define a semantically related turn, and/or by operating a computer model (e.g., a paraphrasing model) to generate the semantically related turn. In some examples, dialogue variations may be collected from human users (for example, from cloud workers or volunteers, such as Amazon Mechanical Turk™ workers).

In some examples, a conversational computing interface may be configured to access annotated dialogues during live operation, for example with one or more pre-defined functions configured to access a context-specific dialogue history including one or more annotated dialogues. For example, the pre-defined functions may include a search-history function configured to find previous plans from the dialogue (e.g., by finding executable program fragments from the context-specific dialogue history), re-use and/or use a code-rewriting function to rewrite previous plans from the dialogue. Furthermore, the conversational computing interface may be configured to handle errors by generating new plans based on previous turns from the context-specific dialogue history, e.g., by rewriting a previously executed plan from a previous turn and/or by utilizing an unexecuted, alternative plan from a previous turn. Accordingly, the conversational computing interface may utilize the herein-described dialogue store data structure to store one or more context-specific dialogue histories. Furthermore, pre-defined functions and conversational computing interface features that are configured to utilize context-specific dialogue histories (e.g., search-history function and/or code-rewriting function, and error handling functions/algorithms) may be implemented in an efficient and/or optimized fashion by utilizing the dialogue store data structure to store a context-specific dialogue history including one or more annotated dialogues. As an example, a search-history function may be configured to find a previous turn from the context-specific dialogue history using an optimized graph traversal algorithm. In addition to improved computational performance, the structure of the dialogue store data structure may permit improved performance with regard to user satisfaction, etc., as the search-history function, code-rewriting function, and error handling functions/algorithms may utilize information in the dialogue store data structure, e.g., relationships between different dialogues. As an example, numeric data such as frequency data and/or scores (e.g., confidence scores) may be utilized to guide searching/filtering the context-specific dialogue history, for example when executing the search-history function. Such information may not be suitable represented and/or organized in alternative data structures, and/or when accessing such information in alternative data structures within a suitable period of time to serve user requests may be infeasible due to computational requirements of accessing such alternative data structures.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 5:
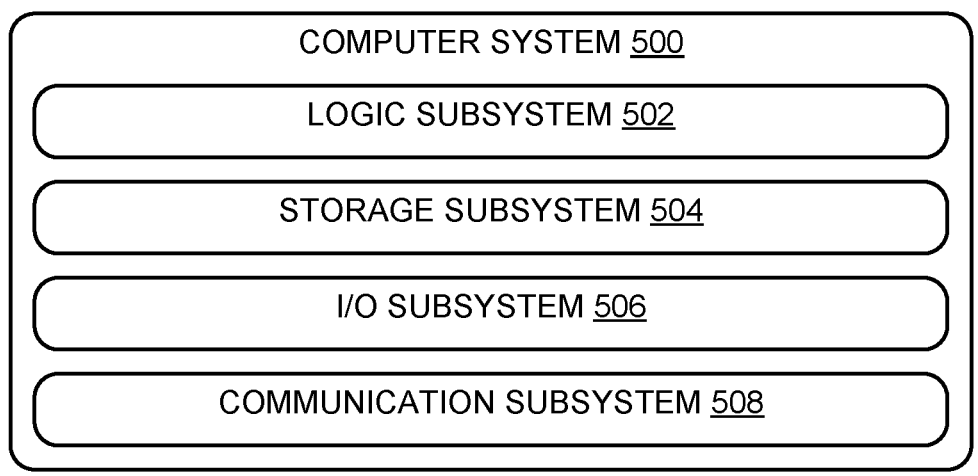
FIG. 5 shows an exemplary computer system.

FIG. 5 schematically shows a simplified representation of a computing system 500 configured to provide any to all of the compute functionality described herein. Computing system 500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 500 includes a logic subsystem 502 and a storage subsystem 504. Computing system 500 may optionally include an input/output subsystem 506, communication subsystem 508, and/or other subsystems not shown in FIG. 1.

Logic subsystem 502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 504 includes one or more physical devices configured to hold computer information temporarily and/or permanently such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, input/output subsystem 506 may include one or more display devices utilizing virtually any type of technology. In some implementations, display subsystem may include one or more virtual-, augmented-, or mixed reality displays, which may be used to present a visual representation of data held by storage subsystem 504. This visual representation may take the form of a GUI (e.g., dialogue GUI 400). Alternately or additionally, input/output subsystem 506 may include a speaker, which may be used to output an audible representation of data held by storage subsystem 504, for example, via speech output.

When included, input subsystem 506 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 508 may be configured to communicatively couple computing system 500 with one or more other computing devices. Communication subsystem 500 may include wired and/or wireless communication devices compatible with one or more different communication protocols. The communication subsystem may be configured for communication via personal-, local- and/or wide-area networks.

Machines may be implemented using any suitable combination of state-of-the-art and/or ML, AI, and/or NLP techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). For example, an annotated dialogue may be used as labelled training data (e.g., for supervised training to predict a suitable annotation given an event). For example, for an annotated dialogue including an event and an annotation indicating a response to that event, the training data features may be defined based on the event and the training data label may be defined based on the annotation. Simultaneously training the plurality of methods, processes, and/or components may improve such collective functioning. In some examples, one or more methods, processes, and/or components may be trained independently of other components (e.g., offline training on historical data).

In some examples, a conversational computing interface may be used to implement an automated assistant, which is configured to assist users via natural language interactions. Automated assistants are one non-limiting example of conversational computing interfaces, and conversational computing interfaces may be implemented according to the present disclosure for any suitable purpose, for example, to permit a user to use natural language to interact with any suitable computer hardware and/or computer software. Conversational computing interfaces such as automated assistants may be referred to by other names, for example as intelligent assistants or automated agents. As such, every reference to an automated assistant, intelligent assistant, and/or automated agent applies equally to any other conversational computer interface or other computing framework configured to respond to speech or text input.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method of configuring a conversational computing interface comprises maintaining a branching dialogue representing a plurality of multi-turn conversations each including a plurality of turns, wherein a turn indicates one or both of a conversational computing interface action and a conversation event, the branching dialogue including a shared prefix of turns common to the plurality of multi-turn conversations and at least two different counterfactual branches descending from the shared prefix of turns, each different counterfactual branch including one or more descendent turns corresponding to a different multi-turn conversation of the plurality of multi-turn conversations. In this or any other example, the method further comprises providing the branching dialogue in a computer-readable format traversable to retrieve a particular multi-turn conversation of the plurality of multi-turn conversations, the particular multi-turn conversation represented by the shared prefix of turns and a particular counterfactual branch including descendent turns corresponding to the particular multi-turn conversation. In this or any other example, the method further comprises, based on a command to modify a turn of a first multi-turn conversation of the plurality of multi-turn conversations, recording a modification to the branching dialogue in the computer-readable format, the modification automatically adding a second, different multi-turn conversation to the branching dialogue in the computer-readable format, the second, different multi-turn conversation including the modified turn. In this or any other example, the method further comprises, based on a command to modify a turn of a first multi-turn conversation of the plurality of multi-turn conversations, recording a modification to the branching dialogue in the computer-readable format, the modification editing the first multi-turn conversation, wherein the modification is also automatically propagated to a second, different multi-turn conversation of the plurality of multi-turn conversations based on the shared prefix. In this or any other example, the branching dialogue in the computer-readable format is maintained in a dialogue store data structure including a plurality of nodes, wherein each node representing a descendent turn in a multi-turn conversation includes a pointer indicating a parent node from which that node descends in the dialogue store data structure. In this or any other example, each node includes at most one pointer indicating a parent node, such that the plurality of nodes and pointers between nodes define a tree structure. In this or any other example, one or more nodes include a plurality of pointers indicating a corresponding plurality of different parent nodes, such that the plurality of nodes and pointers between nodes define a directed acyclic graph structure. In this or any other example, two different nodes of the dialogue store data structure each have a pointer to a shared parent node, wherein the shared parent node corresponds to a last turn in the shared prefix of turns and the two different nodes are constituent elements of two different counterfactual branches. In this or any other example, the method further comprises, based on a command to modify a previously-defined multi-turn conversation, recording a modification to the branching dialogue in the computer-readable format, the modification automatically adding to the dialogue store data structure a new node having a parent pointer to a parent node in a prefix of turns of the previously-defined multi-turn conversation. In this or any other example, the branching dialogue further includes metadata indicating a sampling frequency with which a corresponding counterfactual branch occurs in a distribution of exemplary multi-turn conversations. In this or any other example, the method further comprises machine-learning training a conversational computing interface with training data sampled from the distribution of exemplary multi-turn conversations based on the sampling frequency. In this or any other example, the branching dialogue includes a counterfactual branch corresponding to an erroneous outcome and metadata labelling the erroneous outcome. In this or any other example, the method further comprises machine-learning training the conversational computing interface to avoid the erroneous outcome. In this or any other example, the branching dialogue further includes a turn including a corrective conversational computing interface action for correcting the erroneous outcome, the method further comprising machine-learning training the conversational computing interface to respond to the erroneous outcome based on the corrective conversational computing interface action.

In an example, a computer system comprises a logic subsystem; and a storage subsystem holding instructions executable by the logic subsystem. In this or any other example, the instructions are executable to maintain, in the storage subsystem, a branching dialogue representing a plurality of multi-turn conversations each including a plurality of turns, wherein a turn indicates one or both of a conversational computing interface action and a conversation event, the branching dialogue including a shared prefix of turns common to the plurality of multi-turn conversations and at least two different counterfactual branches descending from the shared prefix of turns, each different counterfactual branch including one or more descendent turns corresponding to a different multi-turn conversation of the plurality of multi-turn conversations. In this or any other example, the instructions are further executable, responsive to receiving a command to modify the branching dialogue, to traverse the branching dialogue in the computer-readable format to locate a previously-defined multi-turn conversation, the previously-defined multi-turn conversation represented by the shared prefix of turns and a particular counterfactual branch including descendent turns corresponding to the previously-defined multi-turn conversation; and to record a modification to the branching dialogue based on the received instruction and the previously-defined multi-turn conversation. In this or any other example, the command to modify the branching dialogue is received via a dialogue graphical user interface. In this or any other example, the command is a command to modify a turn of the previously-defined multi-turn conversation of the plurality of multi-turn conversations, and the command also triggers automatic addition of a second, different multi-turn conversation to the branching dialogue in the computer-readable format, the second, different multi-turn conversation including the modified turn. In this or any other example, the command is a command to modify a turn of the previously-defined multi-turn conversation of the plurality of multi-turn conversations, the command also triggers automatically propagating an edit applied to the previously-defined multi-turn conversation to a second, different multi-turn conversation of the plurality of multi-turn conversations based on the shared prefix. In this or any other example, the branching dialogue is maintained in a dialogue store data structure including a plurality of nodes, wherein a node representing a descendent turn in a multi-turn conversation includes a pointer indicating a parent node from which that node descends in the dialogue store data structure, the parent node corresponding to a parent turn from which the turn descends in the multi-turn conversation. In this or any other example, the command triggers automatically adding to the dialogue store data structure a new node having a parent pointer to a parent node in a prefix of turns of the previously-defined multi-turn conversation.

In an example, a method of configuring a conversational computing interface comprises maintaining, in a dialogue store data structure including a plurality of nodes, a branching dialogue representing a plurality of multi-turn conversations. In this or any other example, each multi-turn conversation is represented by a plurality of nodes, each node representing a turn in the multi-turn conversation, and each turn indicating one or both of a conversational computing interface action and a conversation event. In this or any other example, the branching dialogue includes a shared prefix of turns common to the plurality of multi-turn conversations and at least two different counterfactual branches descending from the shared prefix of turns, each different counterfactual branch including one or more descendent turns corresponding to a different multi-turn conversation of the plurality of multi-turn conversations, and each node representing a descendent turn in a multi-turn conversation includes a pointer indicating a parent node from which that node descends in the dialogue store data structure. In this or any other example, the method further comprises providing the dialogue store data structure in a computer-readable format traversable to retrieve a particular multi-turn conversation of the plurality of multi-turn conversations, the particular multi-turn conversation represented by the shared prefix of turns and a particular counterfactual branch including descendent turns corresponding to the particular multi-turn conversation.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. A method of configuring a conversational computing interface, comprising:
maintaining a branching dialogue representing a plurality of multi-turn conversations each including a plurality of turns, wherein a turn indicates one or both of a conversational computing interface action and a conversation event, the branching dialogue including a shared prefix of turns common to the plurality of multi-turn conversations and at least two different counterfactual branches descending from the shared prefix of turns, each different counterfactual branch including one or more descendent turns corresponding to a different multi-turn conversation of the plurality of multi-turn conversations;
responsive to receiving a command to modify the branching dialogue, traversing the branching dialogue to retrieve a particular multi-turn conversation of the plurality of multi-turn conversations, the particular multi-turn conversation represented by the shared prefix of turns and a particular counterfactual branch including descendent turns corresponding to the particular multi-turn conversation; and
recording a modification to the branching dialogue based on the received command and the particular multi-turn conversation.

2. The method of claim 1, wherein the command is to modify a turn of the particular multi-turn conversation of the plurality of multi-turn conversations, and recording the modification to the branching dialogue in the computer-readable format includes automatically adding a second, different multi-turn conversation to the branching dialogue in the computer-readable format, the second, different multi-turn conversation including the modified turn.

3. The method of claim 1, wherein the command is to modify a turn of the particular multi-turn conversation of the plurality of multi-turn conversations, and recording the modification to the branching dialogue in the computer-readable format includes editing the particular multi-turn conversation, wherein the modification is also automatically propagated to a second, different multi-turn conversation of the plurality of multi-turn conversations based on the shared prefix.

4. The method of claim 1, wherein the branching dialogue in the computer-readable format is maintained in a dialogue store data structure including a plurality of nodes, wherein each node representing a descendent turn in a multi-turn conversation includes a pointer indicating a parent node from which that node descends in the dialogue store data structure.

5. The method of claim 4, wherein each node includes at most one pointer indicating a parent node, such that the plurality of nodes and pointers between nodes define a tree structure.

6. The method of claim 4, wherein one or more nodes include a plurality of pointers indicating a corresponding plurality of different parent nodes, such that the plurality of nodes and pointers between nodes define a directed acyclic graph structure.

7. The method of claim 4, wherein two different nodes of the dialogue store data structure each have a pointer to a shared parent node, wherein the shared parent node corresponds to a last turn in the shared prefix of turns and the two different nodes are constituent elements of two different counterfactual branches.

8. The method of claim 4, further comprising recording the modification to the branching dialogue in the computer-readable format, the modification automatically adding to the dialogue store data structure a new node having a parent pointer to a parent node in a prefix of turns of the particular multi-turn conversation.

9. The method of claim 1, wherein the branching dialogue further includes metadata indicating a sampling frequency with which a corresponding counterfactual branch occurs in a distribution of exemplary multi-turn conversations.

10. The method of claim 9, further comprising machine-learning training a conversational computing interface with training data sampled from the distribution of exemplary multi-turn conversations based on the sampling frequency.

11. The method of claim 1, wherein the branching dialogue includes a counterfactual branch corresponding to an erroneous outcome and metadata labelling the erroneous outcome.

12. The method of claim 11, further comprising machine-learning training the conversational computing interface to avoid the erroneous outcome.

13. The method of claim 11, wherein the branching dialogue further includes a turn including a corrective conversational computing interface action for correcting the erroneous outcome, the method further comprising machine-learning training the conversational computing interface to respond to the erroneous outcome based on the corrective conversational computing interface action.

14. A computer system, comprising:
a logic subsystem; and
a storage subsystem holding instructions executable by the logic subsystem to:
maintain, in the storage subsystem, a branching dialogue representing a plurality of multi-turn conversations each including a plurality of turns, wherein a turn indicates one or both of a conversational computing interface action and a conversation event, the branching dialogue including a shared prefix of turns common to the plurality of multi-turn conversations and at least two different counterfactual branches descending from the shared prefix of turns, each different counterfactual branch including one or more descendent turns corresponding to a different multi-turn conversation of the plurality of multi-turn conversations; and
responsive to receiving a command to modify the branching dialogue:
traverse the branching dialogue in the computer-readable format to locate a previously-defined multi-turn conversation, the previously-defined multi-turn conversation represented by the shared prefix of turns and a particular counterfactual branch including descendent turns corresponding to the previously-defined multi-turn conversation; and
record a modification to the branching dialogue based on the received instruction and the previously-defined multi-turn conversation.

15. The computer system of claim 14, wherein the command to modify the branching dialogue is received via a dialogue graphical user interface.

16. The computer system of claim 14, wherein the command is a command to modify a turn of the previously-defined multi-turn conversation of the plurality of multi-turn conversations, and the command also triggers automatic addition of a second, different multi-turn conversation to the branching dialogue in the computer-readable format, the second, different multi-turn conversation including the modified turn.

17. The computer system of claim 14, wherein the command is a command to modify a turn of the previously-defined multi-turn conversation of the plurality of multi-turn conversations, the command also triggers automatically propagating an edit applied to the previously-defined multi-turn conversation to a second, different multi-turn conversation of the plurality of multi-turn conversations based on the shared prefix.

18. The computer system of claim 14, wherein the branching dialogue is maintained in a dialogue store data structure including a plurality of nodes, wherein a node representing a descendent turn in a multi-turn conversation includes a pointer indicating a parent node from which that node descends in the dialogue store data structure, the parent node corresponding to a parent turn from which the turn descends in the multi-turn conversation.

19. The computer system of claim 18, wherein the command triggers automatically adding to the dialogue store data structure a new node having a parent pointer to a parent node in a prefix of turns of the previously-defined multi-turn conversation.

20. A method of configuring a conversational computing interface, comprising:

maintaining, in a dialogue store data structure including a plurality of nodes, a branching dialogue representing a plurality of multi-turn conversations, wherein:
  each multi-turn conversation is represented by a plurality of nodes, each node representing a turn in the multi-turn conversation, and each turn indicating one or both of a conversational computing interface action and a conversation event;
  the branching dialogue includes a shared prefix of turns common to the plurality of multi-turn conversations and at least two different counterfactual branches descending from the shared prefix of turns, each different counterfactual branch including one or more descendent turns corresponding to a different multi-turn conversation of the plurality of multi-turn conversations, and
  each node representing a descendent turn in a multi-turn conversation includes a pointer indicating a parent node from which that node descends in the dialogue store data structure; and
responsive to receiving a command to modify the branching dialogue, traversing the dialogue store data structure in a computer-readable format to retrieve a particular multi-turn conversation of the plurality of multi-turn conversations, the particular multi-turn conversation represented by the shared prefix of turns and a particular counterfactual branch including descendent turns corresponding to the particular multi-turn conversation; and
recording a modification to the branching dialogue based on the received command and the particular multi-turn conversation.

* * * * *